US012807816B2

(12) United States Patent
Li

(10) Patent No.: US 12,807,816 B2
(45) Date of Patent: Nov. 24, 2026

(54) BI-MODULUS ADAPTIVE MECHANICAL METAMATERIALS (AMM) TOWARDS INFINITY-D PRINTING

(71) Applicant: Northeastern University, Boston, MA (US)

(72) Inventor: Yaning Li, Winchester, MA (US)

(73) Assignee: Northeastern University, Boston, MA (US)

( * ) Notice: Subject to any disclaimer, the term of this patent is extended or adjusted under 35 U.S.C. 154(b) by 135 days.

(21) Appl. No.: 19/059,439

(22) Filed: Feb. 21, 2025

(65) Prior Publication Data

US 2025/0263553 A1 Aug. 21, 2025

Related U.S. Application Data

(60) Provisional application No. 63/555,975, filed on Feb. 21, 2024.

(51) Int. Cl.
*B32B 3/10* (2006.01)
*C08L 101/12* (2006.01)

(52) U.S. Cl.
CPC .................................. *C08L 101/12* (2013.01)

(58) Field of Classification Search
None
See application file for complete search history.

(56) References Cited

U.S. PATENT DOCUMENTS 11,028,895 B2 * 6/2021 Yang ........................ F16F 3/02

FOREIGN PATENT DOCUMENTS

WO WO-2015164663 A1 * 10/2015 ............ B33Y 10/00
WO WO-2025061777 A1 * 3/2025 ............. B22F 10/00

* cited by examiner

*Primary Examiner* — Christopher M Polley
(74) *Attorney, Agent, or Firm* — Foley Hoag LLP; Dana M. Gordon; John D. Lanza

(57) ABSTRACT

A mechanical metamaterial adaptive to an applied stress comprises a plurality of meta-capsules arranged in a lattice structure. Each meta-capsule comprises a plurality of rigid parts and a plurality of elastically deformable soft parts coupled to the plurality of rigid parts, such that at least a subset of the plurality of meta-capsules undergo a reconfiguration under the applied stress. The reconfiguration includes a deformation of the soft parts of the meta-capsules in the subset, and a reduction of a gap between adjacent rigid parts of the meta-capsules in the subset, thereby increasing a stiffness of the mechanical metamaterial from a first stiffness to a second stiffness when the adjacent rigid parts come into contact.

20 Claims, 40 Drawing Sheets

$g_c = g_t = g$

Macro- 3D printed sample

Micro- 3D printed sample

BI-MODULUS ADAPTIVE MECHANICAL METAMATERIALS (AMM) TOWARDS INFINITY-D PRINTING

CROSS REFERENCE TO RELATED APPLICATIONS

This application claims the benefit of priority to U.S. Provisional Patent Application No. 63/555,975, filed Feb. 21, 2024.

BACKGROUND

Field of the Disclosed Subject Matter

The disclosed subject matter relates to mechanical metamaterials, and more particularly to adaptive mechanical metamaterials with strain-responsive meta-capsules that can instantaneously change local modulus to redistribute stress.

DESCRIPTION OF RELATED ART

Conventional engineering materials typically exhibit a single, fixed modulus under relatively small deformations. This leads to a uniform mechanical response that does not adapt to varying stress or strain conditions. As a result, these materials are often susceptible to failure when subjected to localized stress concentrations. This can often lead to irreversible damage of the material.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

The described adaptive mechanical metamaterial technology offers several advantages and advantageous uses. The ability to redistribute stress within the lattice structure in response to applied forces allows for improved structural integrity and damage resistance in various applications. The metamaterial's adaptive nature enables it to optimize its mechanical properties in real-time, potentially leading to more efficient and durable designs in fields such as aerospace, automotive, and civil engineering. The multi-state configuration of the meta-capsules provides a high degree of tunability, allowing for customized responses to different types of stresses and strains. This adaptability could be particularly beneficial in creating smart structures that can respond to changing environmental conditions or load requirements. Additionally, the scalability of the design from micro to macro levels opens up possibilities for applications ranging from nanodevices to large-scale infrastructure, potentially revolutionizing material design across multiple industries.

To achieve these and other advantages and in accordance with the purpose of the disclosed subject matter, as embodied and broadly described, the disclosed subject matter includes a mechanical metamaterial adaptive to an applied stress comprising a plurality of meta-capsules arranged in a lattice structure. Each meta-capsule comprises a plurality of rigid parts and a plurality of elastically deformable soft parts coupled to the plurality of rigid parts, such that at least a subset of the plurality of meta-capsules undergo a reconfiguration under the applied stress. The reconfiguration includes: a deformation of the soft parts of the meta-capsules in the subset, and a reduction of a gap between adjacent rigid parts of the meta-capsules in the subset, thereby increasing a stiffness of the mechanical metamaterial from a first stiffness to a second stiffness when the adjacent rigid parts come into contact.

In some embodiments, the plurality of meta-capsules is arranged in the lattice structure, such that at least two rigid parts of each meta-capsule are coupled to at least two rigid parts of an adjacent meta-capsule.

In some embodiments, the lattice structure comprises a 2D square lattice.

In some embodiments, the lattice structure comprises a 2D triangular square lattice.

In some embodiments, the lattice structure comprises a Bravais lattice.

In some embodiments, the Bravais lattice comprises a cubic lattice or a body-centered lattice.

In some embodiments, each of the plurality of soft parts comprises an annular structure.

In some embodiments the applied stress comprises one of a tensile stress, a compressive stress, and a shear stress.

In some embodiments, under an applied tensile stress, the adjacent rigid parts come into contact over a first contact surface area, and under an applied compressive stress, the adjacent rigid parts come into contact over a second contact surface area, the first contact surface area different from the second contact surface area.

In some embodiments, the first contact surface area is smaller than the second contact surface area.

In some embodiments, the plurality of rigid parts of each meta-capsule is formed of a rigid photosensitive polymer.

In some embodiments, the plurality of soft parts of each meta-capsule is formed of a flexible photosensitive polymer.

In some embodiments, the plurality of rigid parts comprises a first rigid part formed by a pair of coplanar members intersecting at a point, the pair of coplanar members having four ends, with each end positioned within one of four second rigid parts, each second rigid part having an opening leading to an interior cavity.

In some embodiments, the plurality of soft parts comprises four soft parts.

In some embodiments, each of the soft parts is coupled to the first rigid part and two second rigid parts.

In some embodiments, the second rigid part comprises a cylindrical structure.

In some embodiments, the first rigid part further comprises a member intersecting at the point, the member perpendicular to the pair of coplanar members and having two ends, with each end of the member positioned within one of two second rigid parts.

In some embodiments, the plurality of soft parts comprises eight soft parts.

In some embodiments, each of the soft parts is coupled to the first rigid part and two second rigid parts.

In some embodiments, upon removal of the applied stress, the reconfiguration of the subset of meta-capsules is reversed, thereby decreasing the stiffness from the second stiffness to the first stiffness.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and implementations of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more implementation(s) or example(s) of the present subject matter in whole or in part.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

References herein to positions of elements (e.g., "top", "bottom") are merely used to describe the orientation of various elements in the FIGURES. It should be noted that the orientation of various elements may different according to other exemplary implementations, and that such variations are intended to be encompassed by the present disclosure.

The term "about" means a range of values inclusive of the specified value that of a person of ordinary skill in the art would reasonably consider to be comparable to the specified value. In some embodiments, "about" means within a standard deviation using measurements generally accepted by a person of ordinary skill in the art. In some embodiments, "about" means ranging up to ±10% of the specified value. In some embodiments, "about" means ranging up to ±5% of the specified value. In some embodiments, "about" means the specified value.

The present disclosure is directed to strain/stress responsive bi-modulus meta-capsules, enabling an instantaneous change in local modulus in response to a small strain. The present disclosure is also directed to adaptive mechanical metamaterials (AMM), including 2D AMM and 3D AMM, which incorporate the meta-capsules. In AMMs, when local stress concentrations occur and the local strain or stress exceeds a threshold, the local stiffness of the material increases, facilitating the redistribution of the stress and preventing localized damage or failure. In this way, the bi-modulus AMMs are dynamic and self-optimizing: the local binary properties enable the material to adapt autonomously and instantaneously to various external loads and constraints. This adaptation behavior is achieved by varying the local state of each unit cell to achieve on-demand stiffness, reduced stress concentration, and high toughness and impact resistance. This inherent adaptability can enable the expansion of conventional 3D printing into a new domain, referred to as infinity-D printing, where the material can continuously adjust to a large array of dynamic loading conditions. Additive manufacturing can be used to create mechanical metamaterials with arbitrary geometry and spatially distributed properties, spanning from macro to micro/nano scales.

Figure 1A:
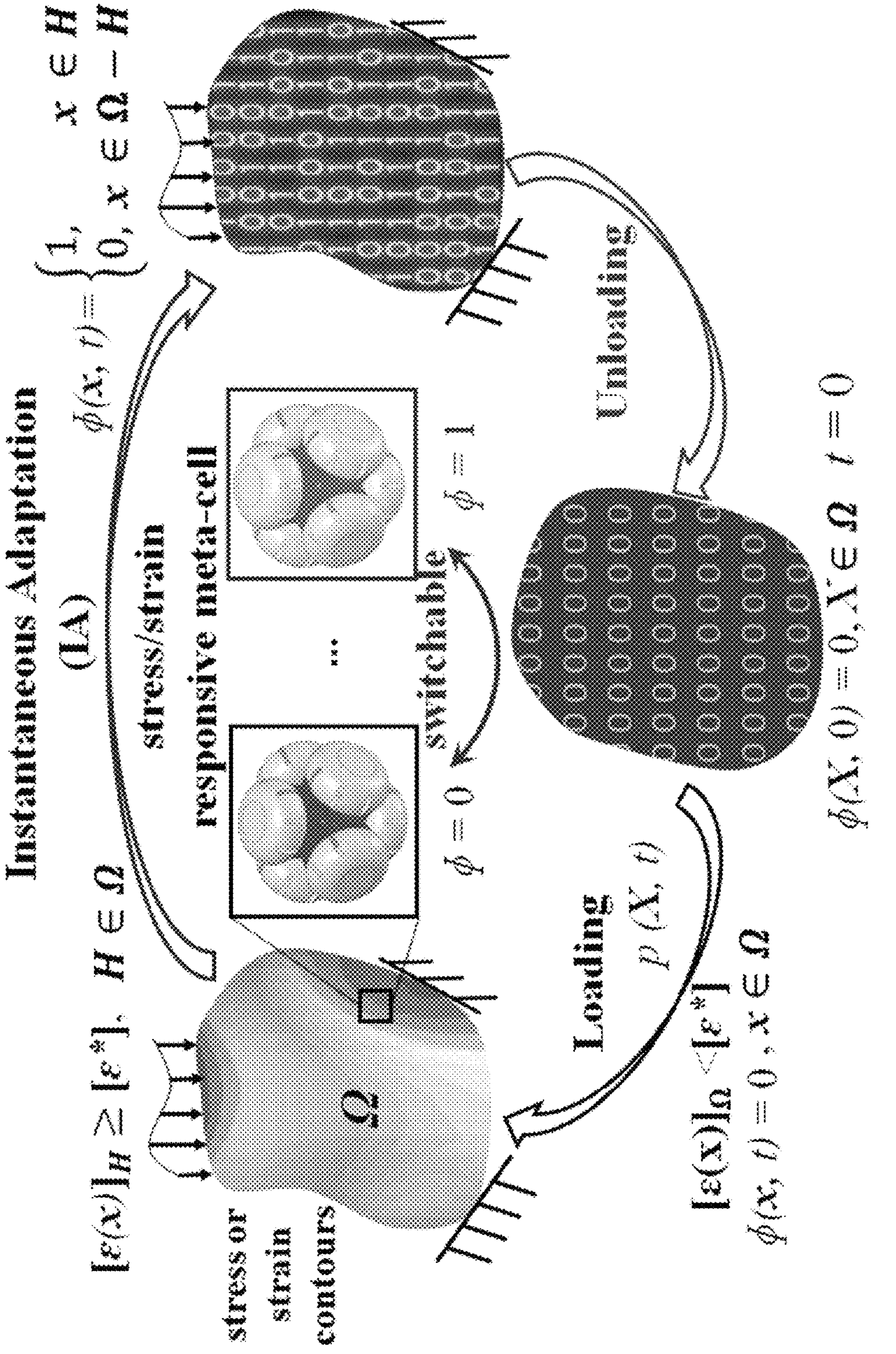
FIG. 1A is a schematic of an adaptive mechanical metamaterial (AMM), in accordance with the present disclosure.
Figure 1B:
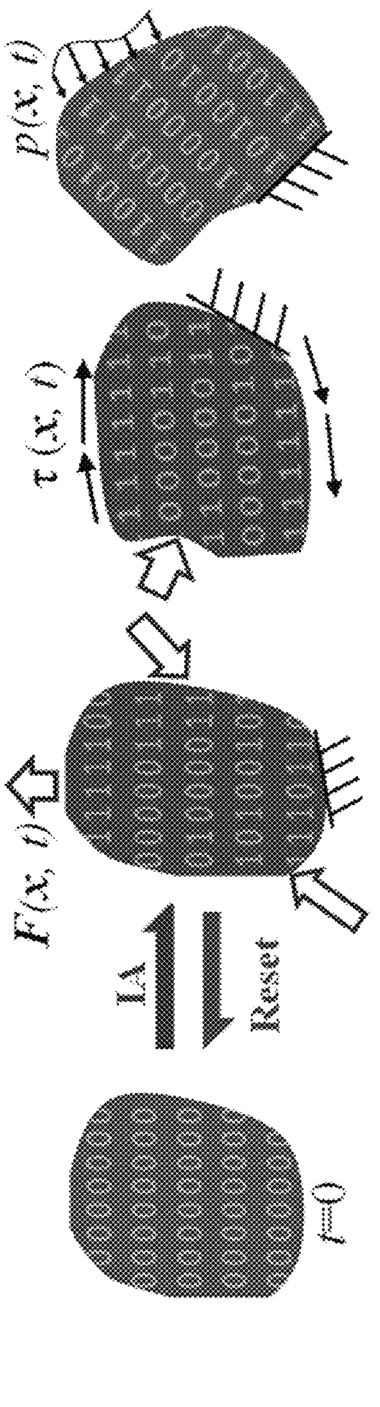
FIG. 1B is a schematic illustrating the instantaneous adaption and reset behavior of an AMM, in accordance with the present disclosure.

Referring now to FIGS. 1A and 1B, schematics illustrating the instantaneous adaption and reset behavior of an AMM is shown. AMMs can be formed of strain/stress elastic bi-modulus meta-capsules with finite numbers of switchable states, enabling the material to exhibit binary local material properties. The AMMs can dynamically respond to external loads, enabling adaptive behaviors such as stiffness modulation during loading and unloading cycles. The change in properties of the meta-capsule is fully recoverable, and the two property states are switchable, allowing the AMM to be reset after any arbitrary loading-unloading cycle. Strains levels can be maintained within a small range, ensuring that stresses and strains in each state are reversible and interchangeable.

Figure 2A:
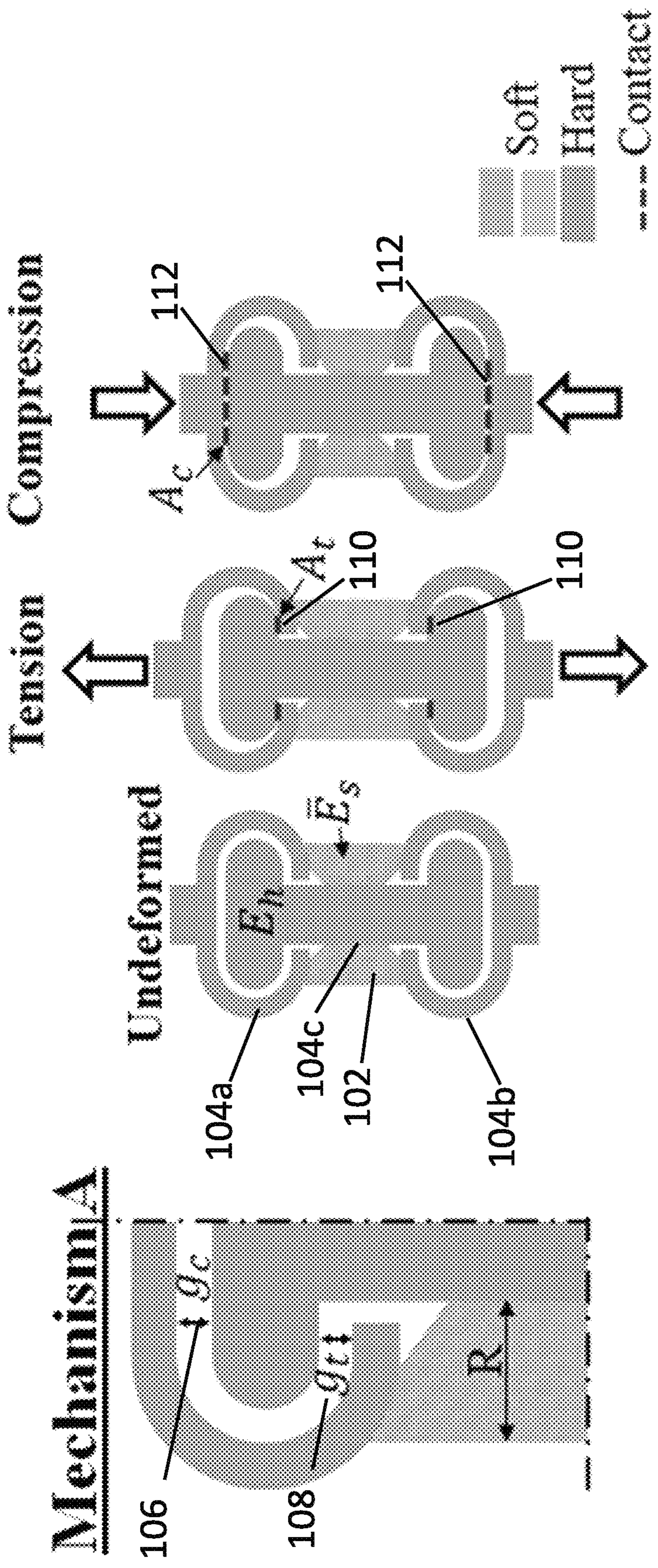
FIG. 2A is a schematic view of a first mechanism of a 1-dimensional (1D) bi-modulus meta-capsule with bi-modulus, in accordance with the present disclosure.
Figure 2B:
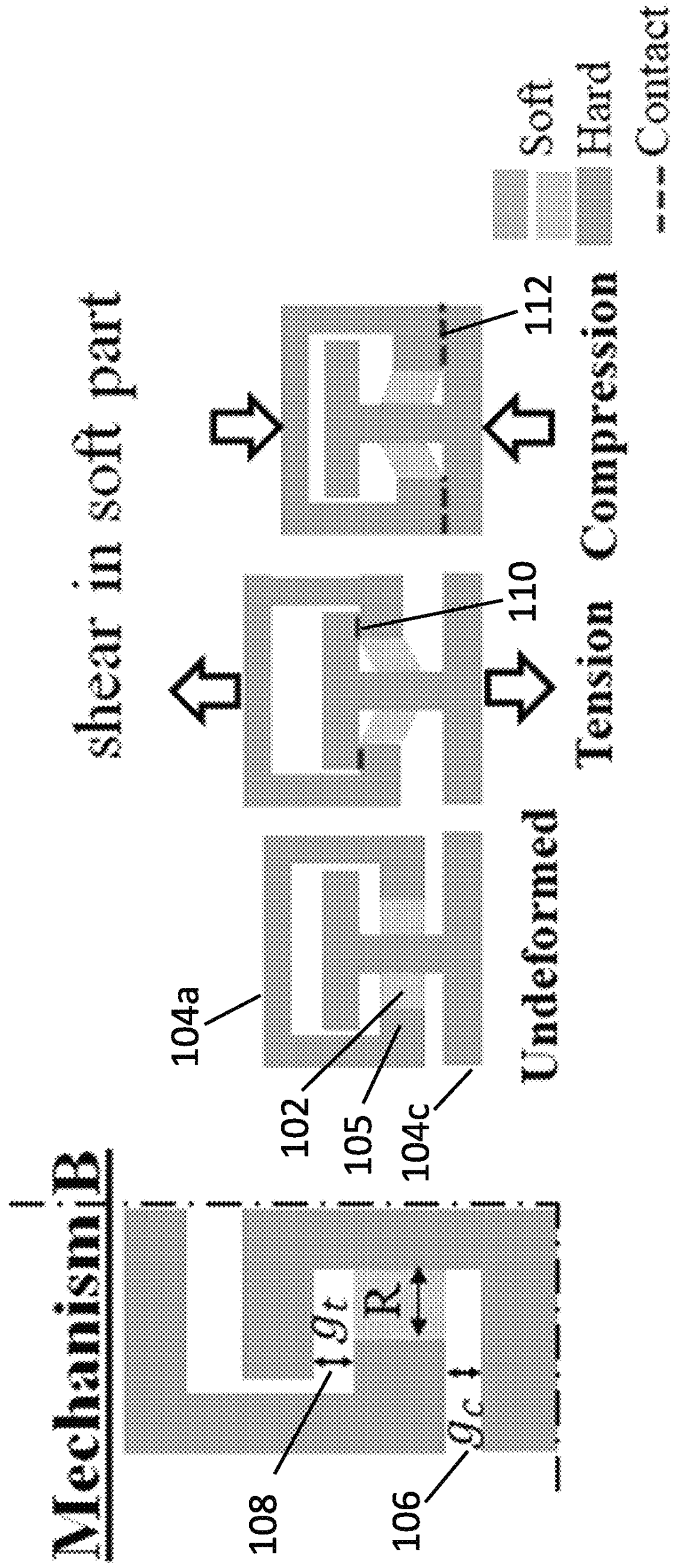
FIG. 2B is a schematic view of a second mechanism of a 1D bi-modulus meta-capsule, in accordance with the present disclosure.

FIGS. 2A and 2B illustrate mechanisms of a 1-dimensional (1D) strain-responsive bi-modulus meta-capsule (capsule). As shown in FIGS. 2A and 2B, a 1D meta-capsule includes one soft, elastically deformable part 102 coupled (e.g., bonded) to multiple hard parts. In some embodiments, the soft part 102 is coupled to three hard parts 104*a-c*. The three hard parts include a first hard part 104*a*, a second hard part 104*b*, and a third hard part 104*c* which extends between the first and second hard parts. The third hard part 104*c* can have a first end, a second end, and a middle portion. In some embodiments, the first and second end of the third hard part 104*c* can be circular discs, while the middle portion can be a cylindrical shaft. In some embodiments, the first and the second end of the third hard part 104*c* can be flat rectangular plates, while the middle portion can be a rectangular shaft. The first end can be positioned within the first hard part 104*a*, while the second end can be positioned within the second hard part 104. The first hard part 104*b* and the second hard part 104*c* can each have an opening that extends to an interior cavity that receives an end of the third hard part 104*c*. The first hard part 104*a* and the second hard part 104*b* can be aligned such that their openings are about concentrically aligned. The soft part 102 can be bonded to the exterior surface of the first and second hard part 104*a*, 104*b* and the middle portion of the third part 104*c*. The soft part 102 can encircle the middle portion of the third hard part 104*c*.

In some embodiments, the soft part 102 is coupled to two hard parts. The 1D meta-capsule can include the first hard part 104*a* and the third hard part 104*c*, with a portion of the third hard part 104*c* (e.g., the first end and the middle portion) positioned within the first hard part 104*a*. The soft part 102 can be bonded to the middle portion of the third part and the edge of opening of the first hard part 104*a*. In some embodiments, at least two of the hard parts are the same shape. In some embodiments, all the hard parts are different shapes. The hard parts can be different shapes such as spherical, ovoidal, rectangular, circular, cylindrical, or irregular shapes. The soft part 102 can also be different shapes. In some embodiments, the soft part is annular (e.g., disk with a through-hole, cylindrical shell). The compliance of the soft part 102 can be tuned by varying the ring thickness.

In the initial state where the soft part 102 is undeformed, multiple gaps (e.g., gaps 106, 108) are defined between adjacent hard parts. In some embodiments, four gaps are defined between three hard parts of a 1D meta-capsule. For example, a 1D meta-capsule can include two $g_c$ gaps 106 and two $g_t$ gaps 108. In some embodiments, the $g_c$ gaps and $g_t$ gaps are about the same height. In some embodiments, the $g_c$ gaps and $g_t$ gaps are different heights. In some embodiments, two gaps are defined between two hard parts of 1D meta-capsule. For example, a 1D meta-capsule can include one $g_c$ gap 106 and one $g_t$ gap 108.

In some embodiments, the soft part elongates in response to tension and compresses (shortens) in response to compression, as shown, for example, in FIG. 2A. In some embodiments, the soft part shears in response to both tension and compression, as shown, for example, in FIG. 2B. When the soft part deforms (e.g., elastically deforms), at least a subset of the gaps between the hard parts is reduced. For example, under compression, the $g_c$ gaps 106 are reduced and under tension, the $g_t$ gaps 108 are reduced. At sufficiently high tension or compression, the gap height is reduced to the point where adjacent hard parts come into contact, transferring the majority of the load and increasing the modulus of the capsule. For example, under tension, the adjacent hard parts defining the $g_t$ gaps 108 make contact over a first surface area 110, while under compression, the adjacent hard parts defining the $g_c$ gaps 106 make contact over a second surface area 112. In some embodiments, the first surface area 110 is smaller than the second surface area 112. In some embodiments, the first surface area 110 and the second surface area 112 are about parallel.

Figure 2C:
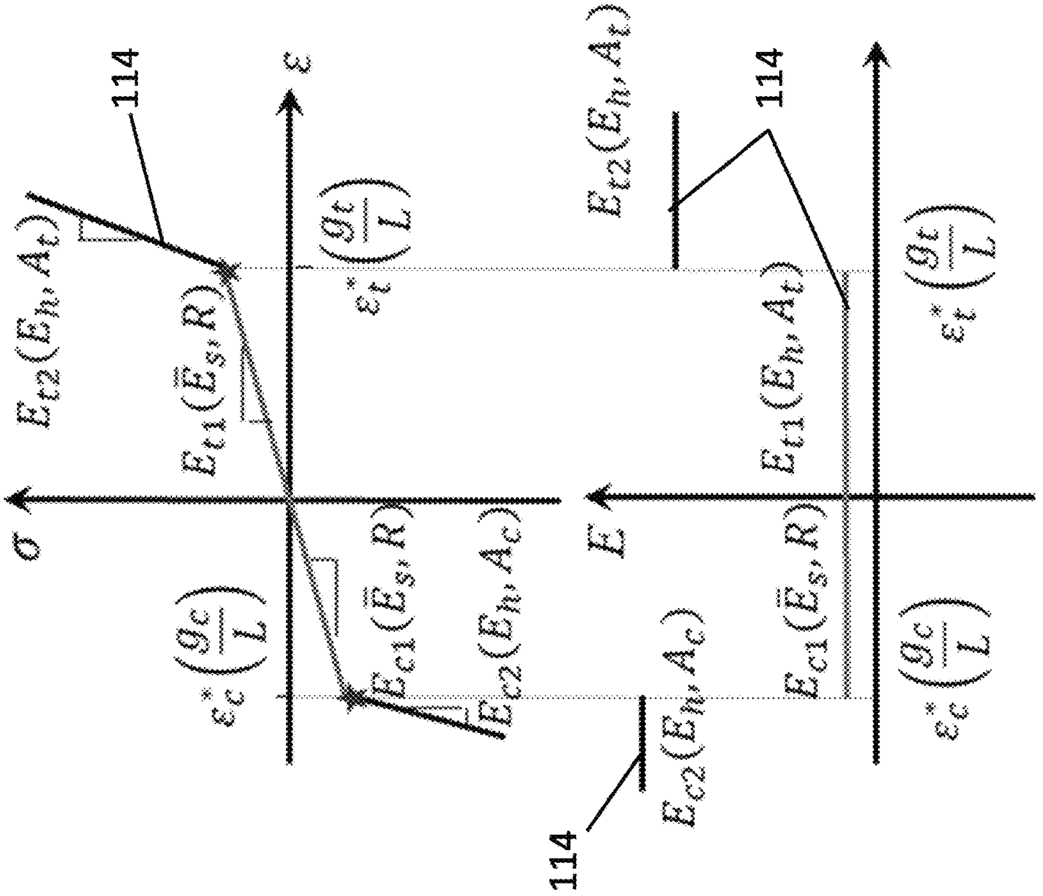
FIG. 2C is a diagram of a stress-strain curve and the corresponding modulus response of a 1D bi-modulus meta-capsule, in accordance with the present disclosure.

Referring now to FIG. 2C, a diagram of a stress-strain curve 114 and the corresponding modulus 116 is shown. The capsule can dynamically adapt to external loads and displacements. For example, when the local load is small, the capsule's modulus remains low. However, when the local load exceeds a certain threshold, the modulus increases, achieving on-demand stiffness. The moduli of the bi-modulus capsule can be tuned by the effective stiffness of the hard parts and the soft part. The effective stiffness depends on the modulus $E_h$ of the hard part and modulus $E_s$ of the soft part, the thickness R of the soft part, and the contact area between adjacent hard parts (e.g., $A_t$, $A_c$). The critical overall strain (e.g., $\in^*_c$, $\in^*_t$) to trigger contact and therefore the shift in the modulus can be tuned by the ratio between the $g_c$ gaps and $g_t$ gaps, and the length L of the capsule. The modulus of the capsule can have a first modulus under tensile loads and a second modulus under compressive loads. In some embodiments, the first modulus under tensile loads and the second modulus under compressive loads is about the same. In some embodiments, these moduli can differ.

The hard parts can have large load bearing capability such that when in contact, the hard parts do not break. Both prior to and following contact, deformation remains minimal, such that stress and strain exhibit a linear relationship, thereby making them interchangeable. The hard parts can be made of one or more rigid materials (e.g., a combination thereof), including but not limited to, a rigid photosensitive polymer, polycarbonate, acrylonitrile butadiene styrene, polyamide, polyetheretherketone (PEEK), polymethyl methacrylate (PMMA), polyvinyl chloride (PVC), high-density polyethylene. The soft part can be made one or more flexible, elastic materials (e.g., a combination thereof) of a flexible photosensitive polymer, silicone rubber, thermoplastic elastomers, thermoplastic polyurethane. The hard parts and the soft part may be produced via 3D printing. For example, the hard parts can be formed of a rigid photosensitive polymer such as VeroWhite, while the soft part can be formed of TangoPlus. In some embodiments, the Young's modulus of each of the hard parts is about 2 GPa. In some embodiments, the shear modulus of the soft part is about 1 MPa. In some embodiments, the shear modulus of the soft part is less than 1 MPa.

Figure 3A:
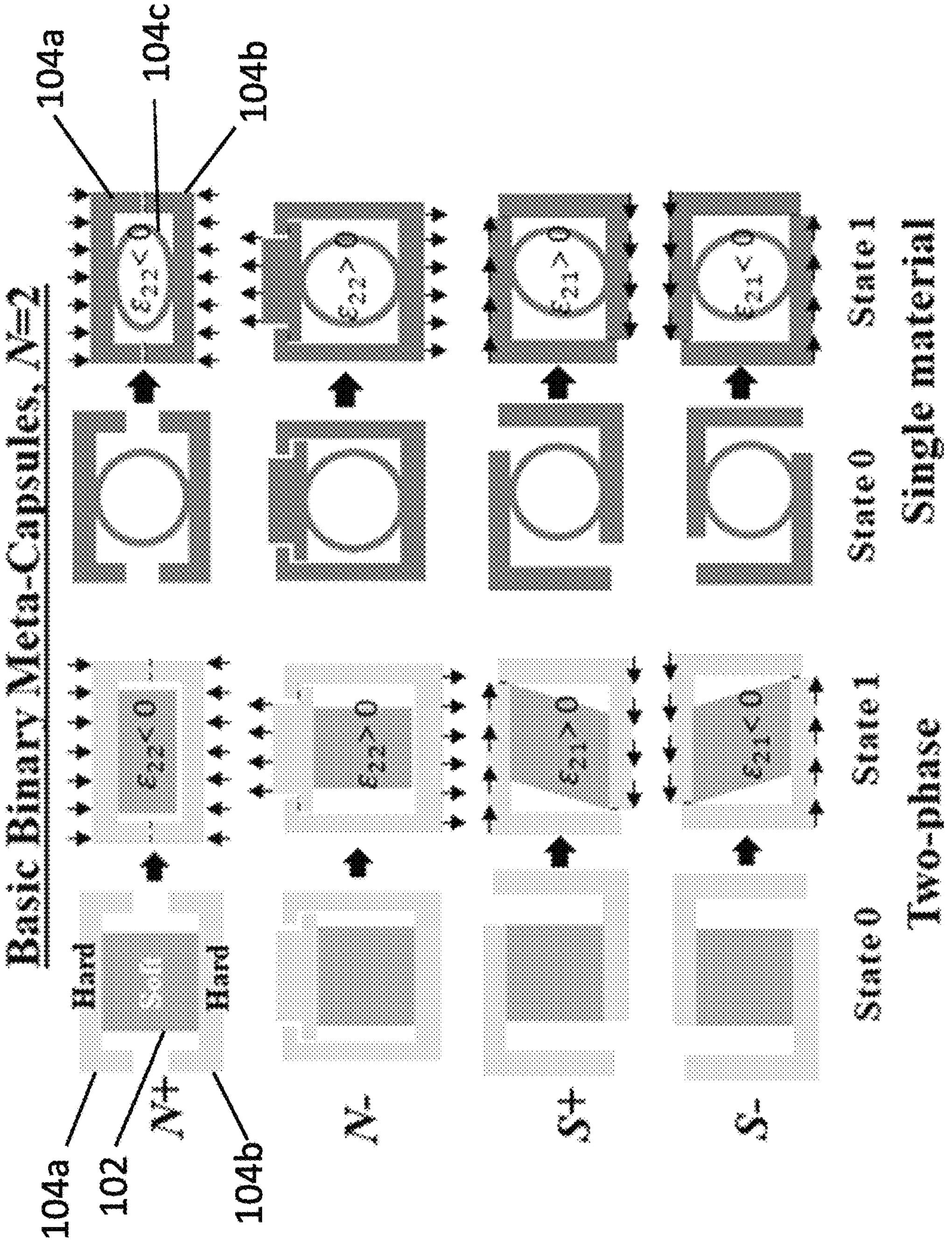
FIG. 3A is a schematic of implementations of bi-modulus two-state meta-capsules for two-phase and single material designs, in accordance with the present disclosure.

Using the mechanisms described above, a family of meta-capsules with bi-modulus behaviors can be designed (e.g., as shown in FIGS. 3A-3E). FIG. 3A illustrates implementations of bi-modulus two-state meta-capsules for both two-phase and single material designs. Two-state refers to the simplest meta-capsules, in which each capsule only exhibits bi-modulus behavior up one strain component. As shown in FIG. 3A, two-phase two-state meta-capsules can include two hard parts 104*a*, 104*b*, and a soft part 102 positioned between and bonded to the two hard parts. In a first state (state 0), the soft part remains undeformed, while in the second state (state 1) the soft part deforms (e.g., stretches, shears), causing the hard parts to come into contact over a defined contact area (e.g., shown with dashed line). In some embodiments, the first and second hard parts 104*a*, 104*b* are generally L-shaped. In some embodiments, the first and second hard parts 104*a*, 104*b* are generally U-shaped with two parallel sides connected by a perpendicular side. Single-material two-state meta-capsules includes three hard parts 104*a-c* formed of the same material. One of the hard parts 302*c* can be circular (e.g., annular structure, ring structure, curved ribs) and positioned between and bonded to the other hard parts 302*a*, 302*b*. In the first state, the circular hard part remains undeformed, while in the second state, it deforms, changing its shape (e.g., from circular to ellipsoidal).

Two-state meta-capsules provide the basic design element for multi-state meta-capsules (N>2). Two-state meta-capsules can be combined to form multi-state meta-capsule with N=3, 4, 8, and 12. For each N value, there are both two phase designs and single material designs. 3D printers with multiple material options can be used to fabricate macro-scale meta-capsules, while 3D printers with single material options can be used to fabricate nano/micro-scale meta-capsules. Micro-scale designs (e.g., mm scale to about 4 inches) can be fabricated using two-photon polymerization. In some embodiments, meta-capsules are between about 20 μm and 2 mm.

Figure 3B:
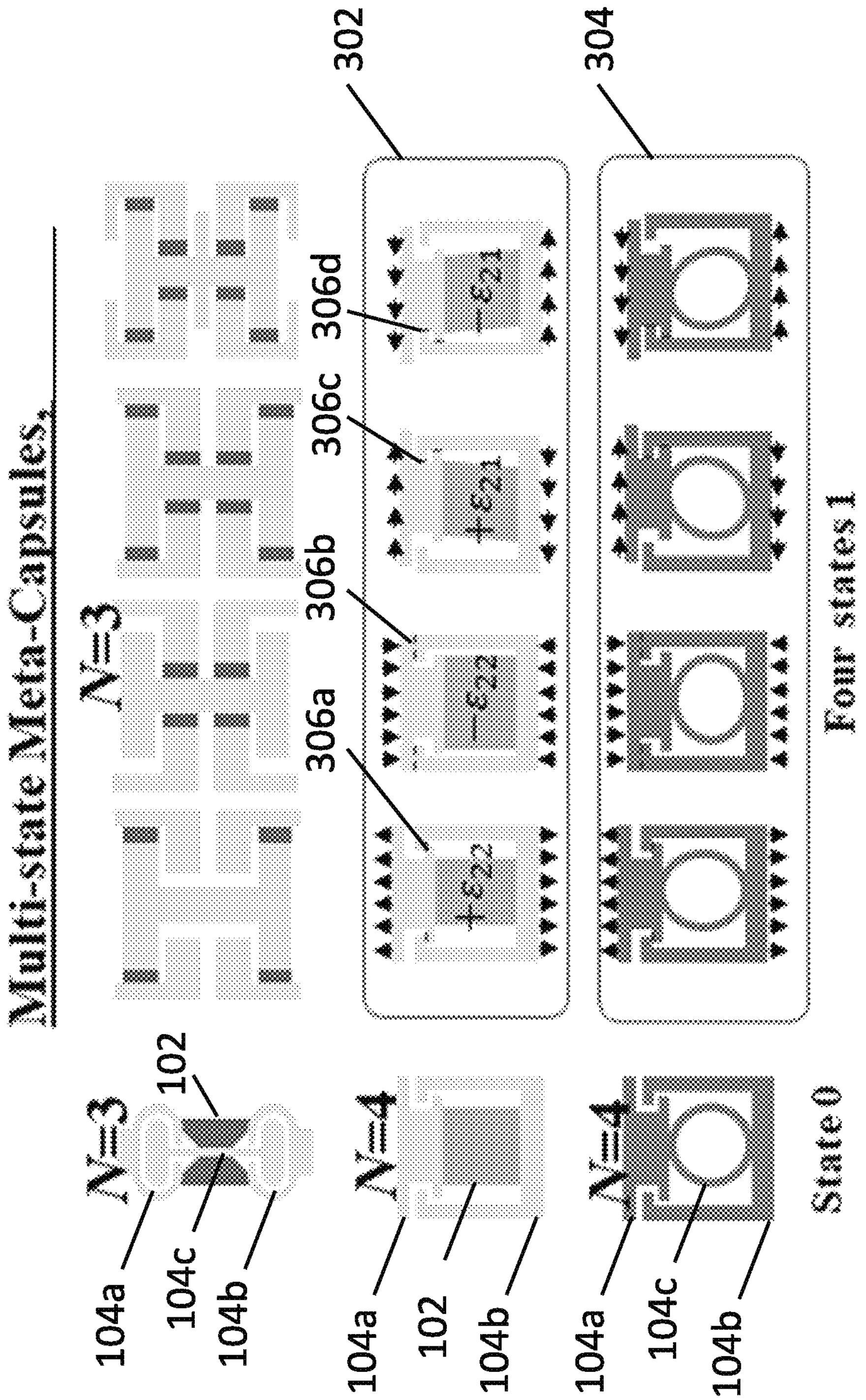
FIGS. 3B-3E is a schematic of implementations of multi-state (N>2) meta-capsules, in accordance with the present disclosure.

FIG. 3B illustrates implementations of bi-modulus three-state, and four-state meta-capsules for two-phase and single material designs. In some embodiments, the soft part includes multiple soft parts (e.g., two soft parts, three soft parts, four soft parts). In some embodiments, a first soft part is bonded to at least two hard parts (e.g., a first hard part and a third hard part), while a second soft part is bonded to at least two hard parts (e.g., a second hard part and the third hard part). The four deformation configurations 302, 304 of a first exemplary four-state meta-capsule with two hard parts 104*a-b* and one soft part 102, and a second exemplary four-state meta-capsule with three hard parts 104*a-c* are shown. Under tension, the hard parts 104*a* and 104*b* of the meta-capsule come into contact over a first contact surface area 306*a*. Under compression, the hard parts come into contact over a second contact surface area 306*b*. Under pure shear (depending on the direction of the shear), the hard parts come into contact over a third contact surface area 306*c* or a fourth contact surface area 306*d*. In some embodiments, at least a subset of the contact surface areas are identical in size. In some embodiments, all of the contact surface area are different. In some embodiments, a first subset of the contact surface areas are perpendicular to a second subset of the contact areas. For example, the first and second contact surface areas 306*a*, 306*b* can be perpendicular to the third and fourth contact surface areas 306*c*, 306*d*. In some embodiments, the contact surface area is a continuous surface area. In some embodiments, the contact surface is a discontinuous surface area.

Figure 3C:
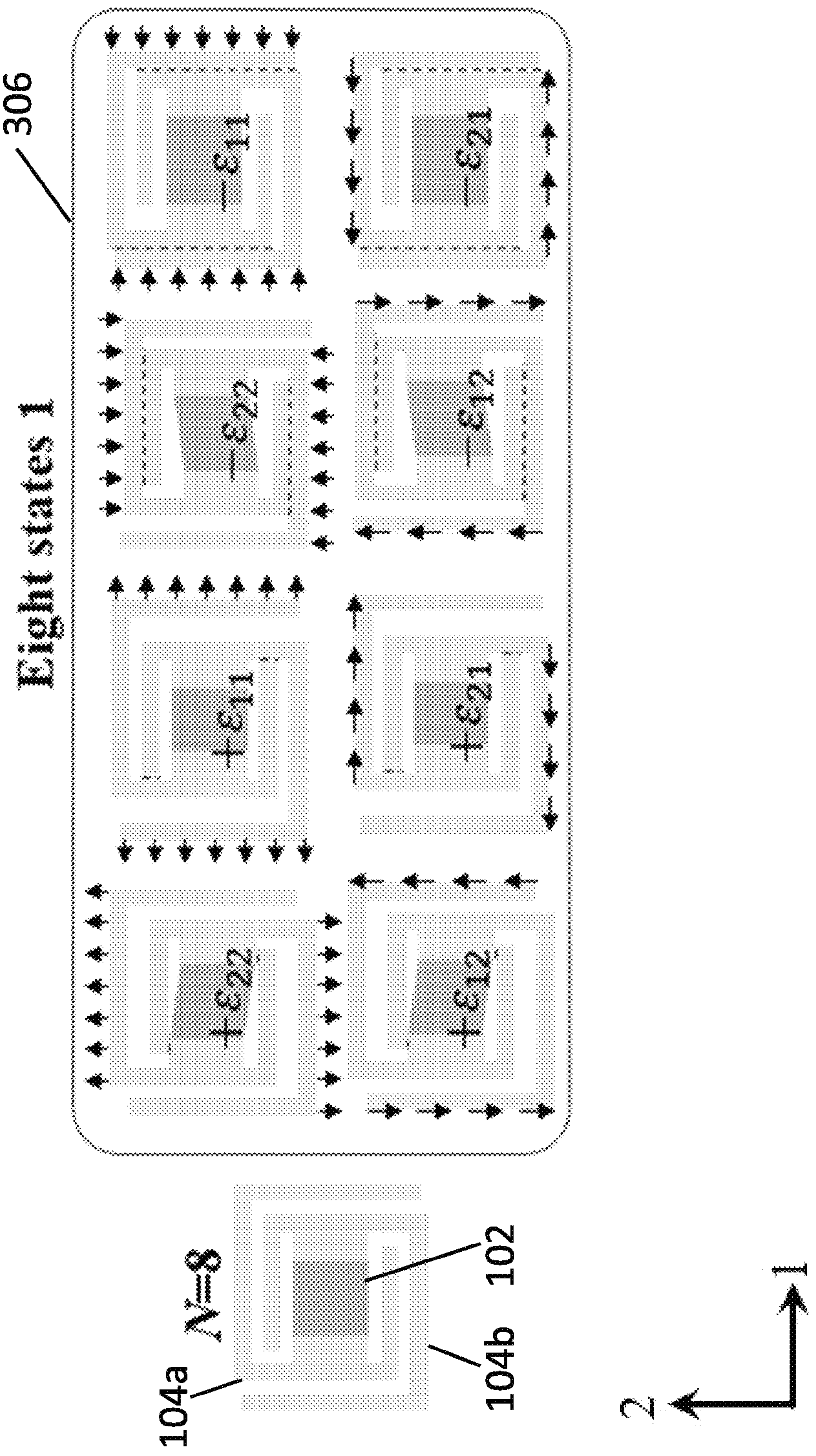
Figure 3D:
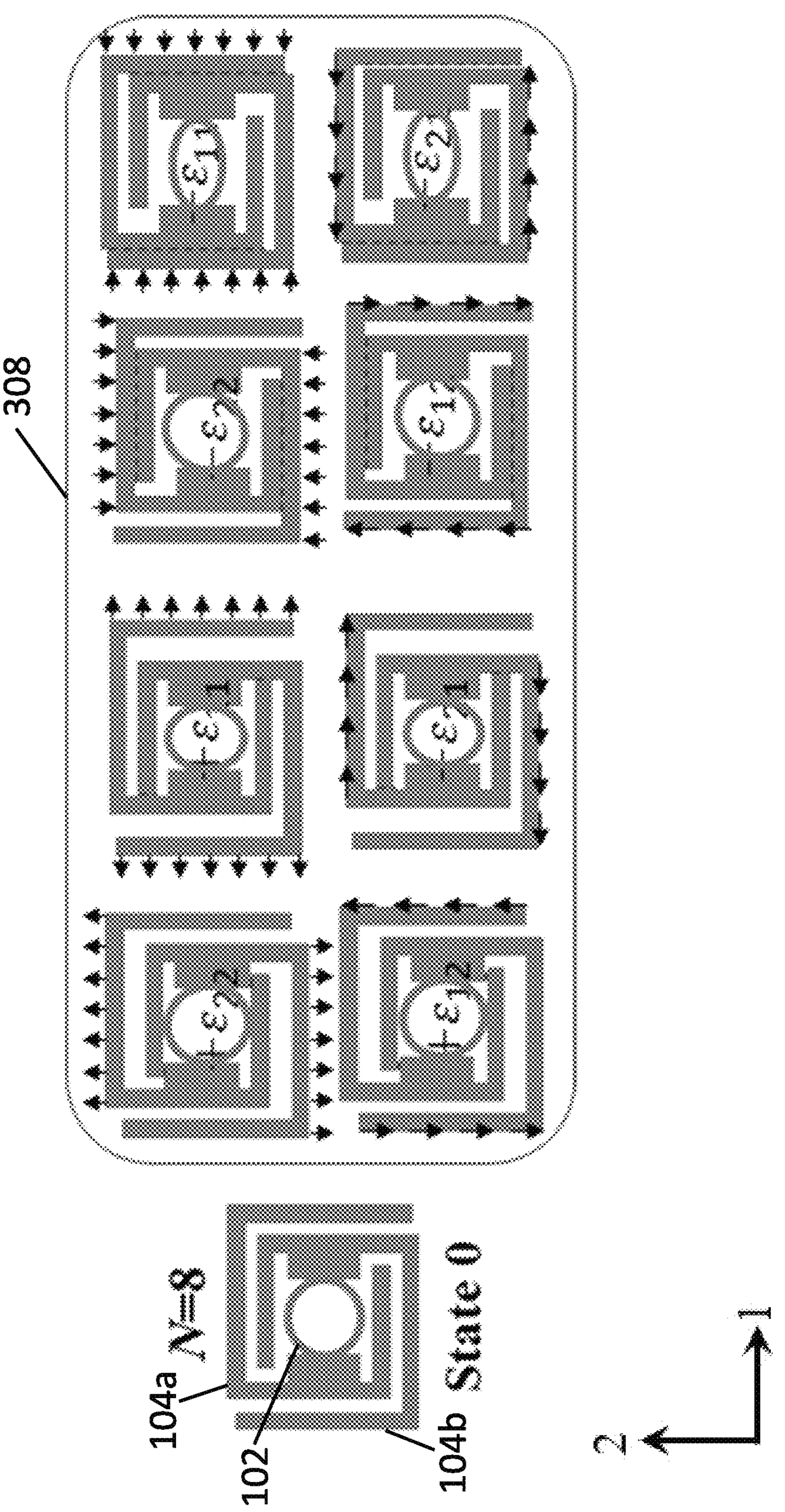

FIGS. 3C and 3D illustrates implementations of bi-modulus eight-state meta-capsules for two-phase and single material designs, respectively. Referring to FIG. 3C, a bi-modulus eight-state two-phase meta-capsule can include two hard parts 104*a*, 104*b* and a soft part 102. Referring to FIG. 3D, a bi-modulus eight-state single material meta-capsule can include three hard parts 104*a-c* a bi-modulus eight-state two-phase meta-capsules. The corresponding deformation configurations 308 are shown.

Figure 3E:
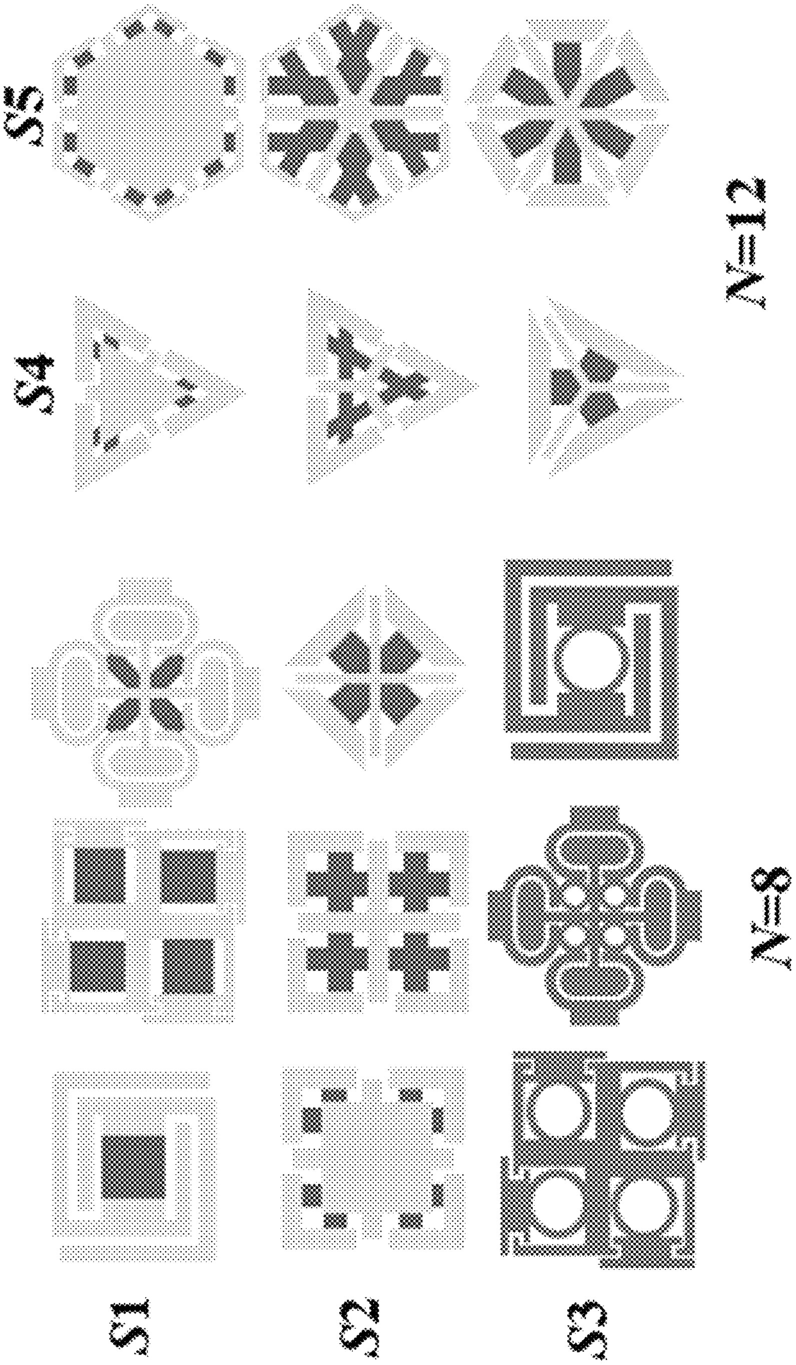

FIG. 3E illustrates additional implementations of bi-modulus eight-state and twelve-state meta-capsules for two-phase and single material designs.

Figure 4A:
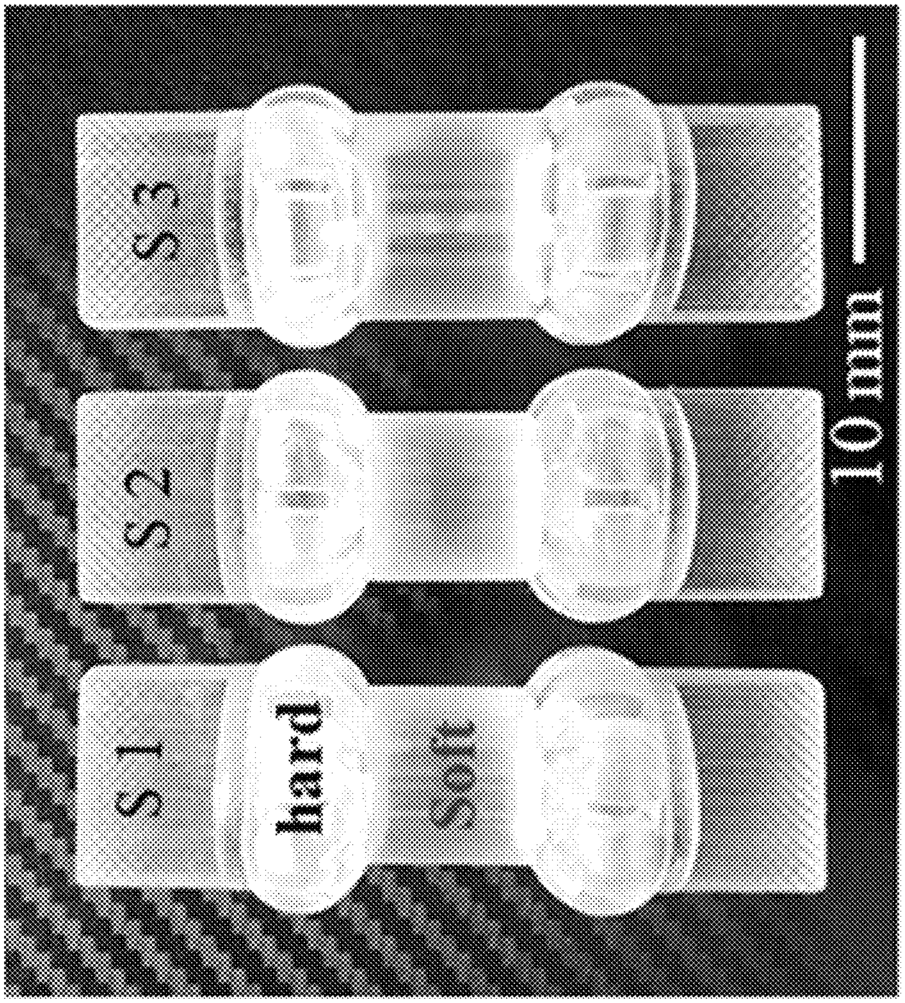
FIG. 4A is a view of 3D-printed two-phase 1D meta-capsules with the first mechanism implemented, in accordance with the present disclosure.
Figure 4B:
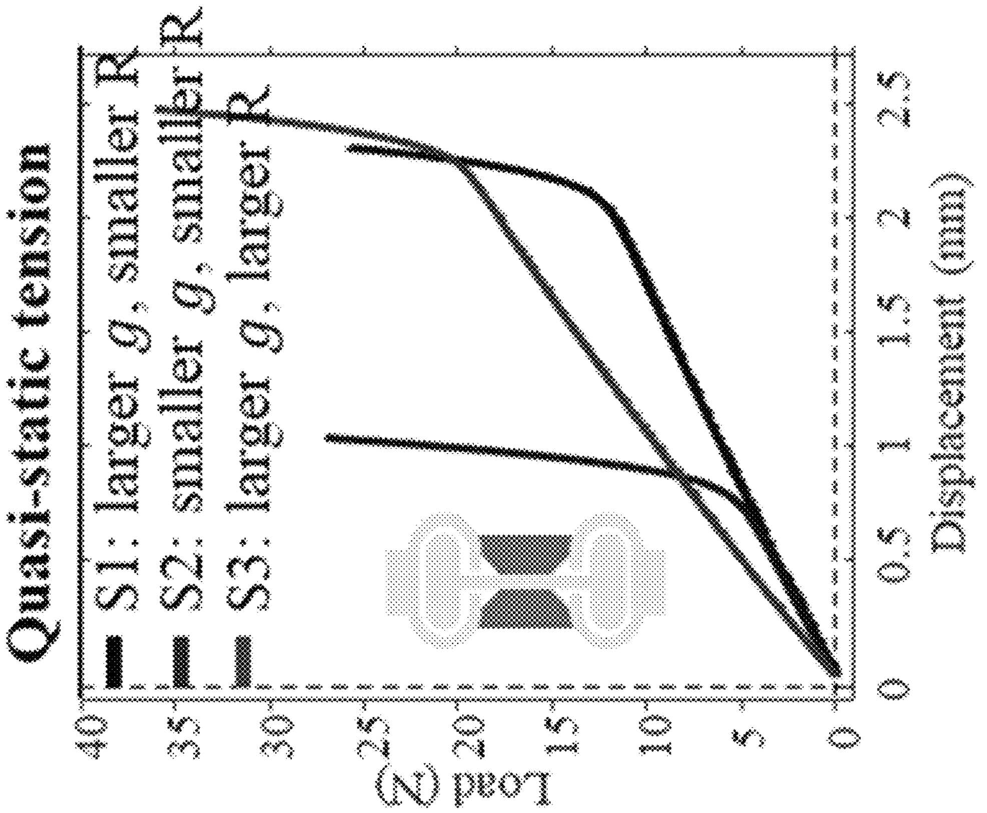
FIG. 4B is a graph of load and displacement curves for 3D-printed two-phase 1D meta-capsules under quasi-static uniaxial tension, in accordance with the present disclosure.
Figure 4C:
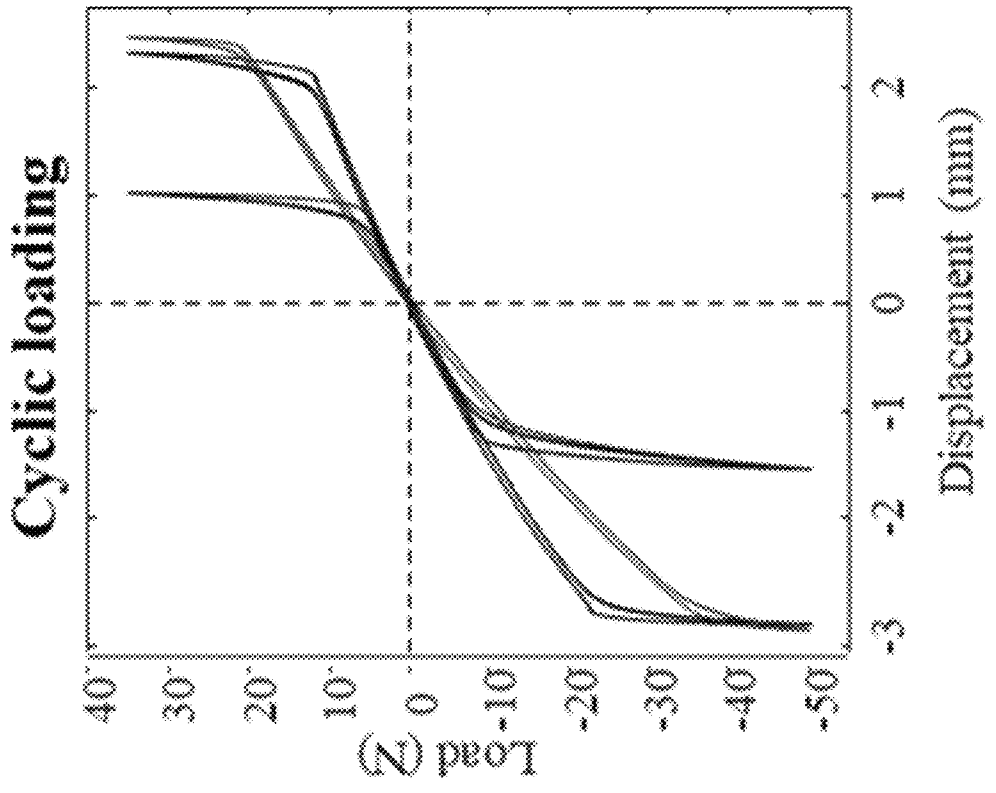
FIG. 4C is a graph of load and displacement curves for the 3D-printed two-phase 1D meta-capsules under cyclic tension-compression, in accordance with the present disclosure.
Figure 4D:
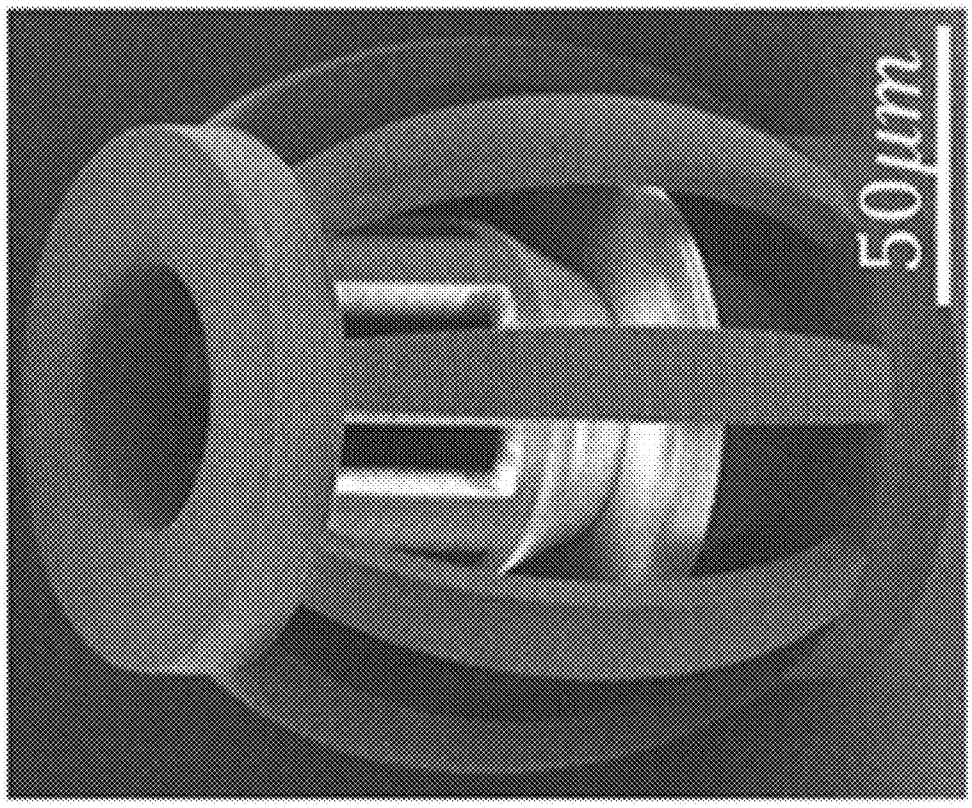
FIG. 4D is a view of a 3D-printed single material meta-capsule, in accordance with the present disclosure.
Figure 4E:
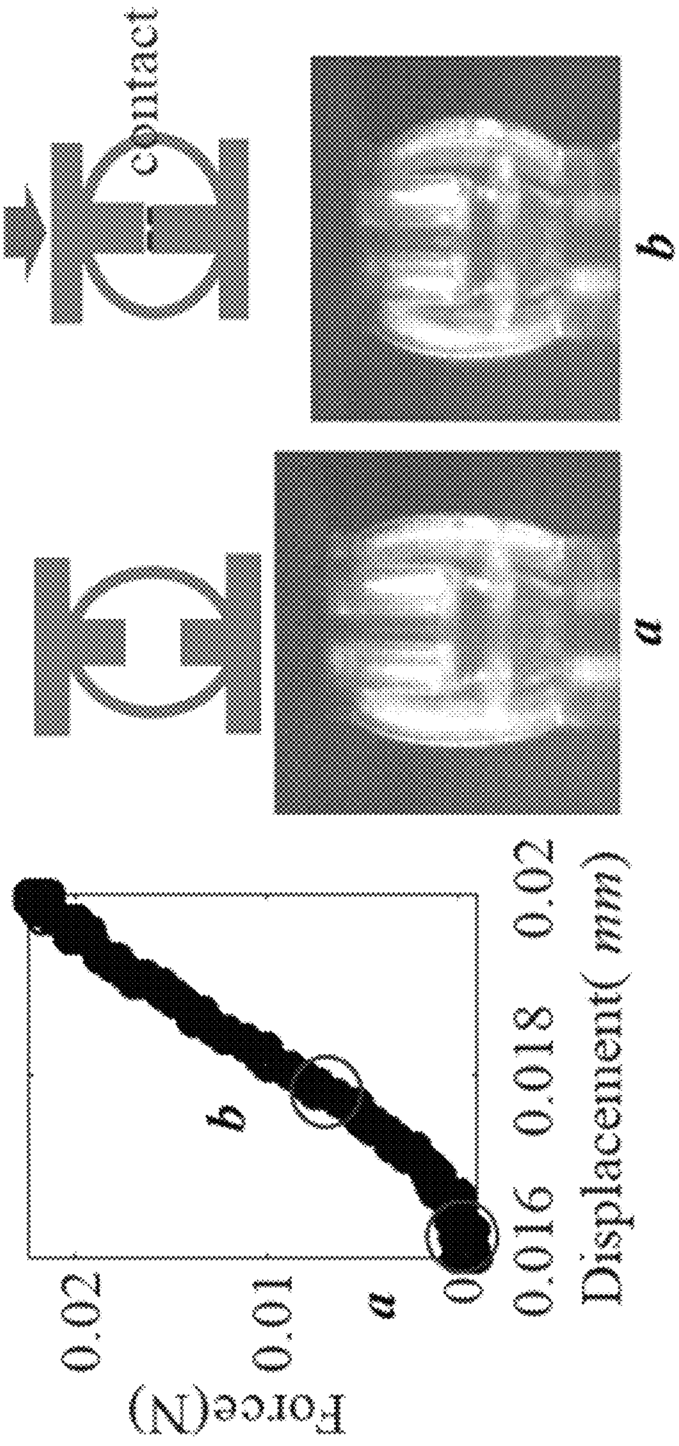
FIG. 4E is a graph of force and displacement for the 3D-printed single material meta-capsule, in accordance with the present disclosure.

FIGS. 4A and 4D are views of meta-capsules that were printed at two length scales. The macro-scale meta-capsules shown in FIG. 4A were printed using a multi-material 3D printer, while the micro-scale meta-capsule shown in FIG. 4D was printed using a Nanoscribe. The macro-scale meta-capsules are two-phase capsules designed with the mechanism shown in FIGS. 2A and 3B (N=3) with varying gap heights and different soft part thickness for comparison. The micro-scale capsule is an equivalent design of the single material capsule shown in FIG. 3A, (N=2, N+, single material). FIGS. 4B and 4C are graphs of load and displacement curves of the meta-capsules shown in FIG. 4A under quasi-static uniaxial tension and cyclic loading, respectively. FIG. 4E includes a graph of the load and displacement curve of the micro-scale capsule shown in FIG. 3A and a schematic showing the initial state and second state where the hard parts come into contact. Both the micro-scale and macro-scale meta-capsules showed bi-modulus behavior with the slopes of the stress-strain curve suddenly increasing after contact. Both moduli can be tuned by design parameters such as the gap height and the thickness of the soft part. Minimal hysteresis was observed in the cyclic loading tests, which indicated that the bi-modulus behavior can be triggered repeatedly with no damage. The micro-scale binary meta-capsule was tested on an in-house set up under uniaxial compression and the deformation process was recorded via an in-house optical setup with an optical camera with a lens (Mitutoyo Objective) of 10× magnification, an adapter, sliding stages, and an extension tube. After one loading cycle, the sample recovered to its original configuration.

Figure 5A:
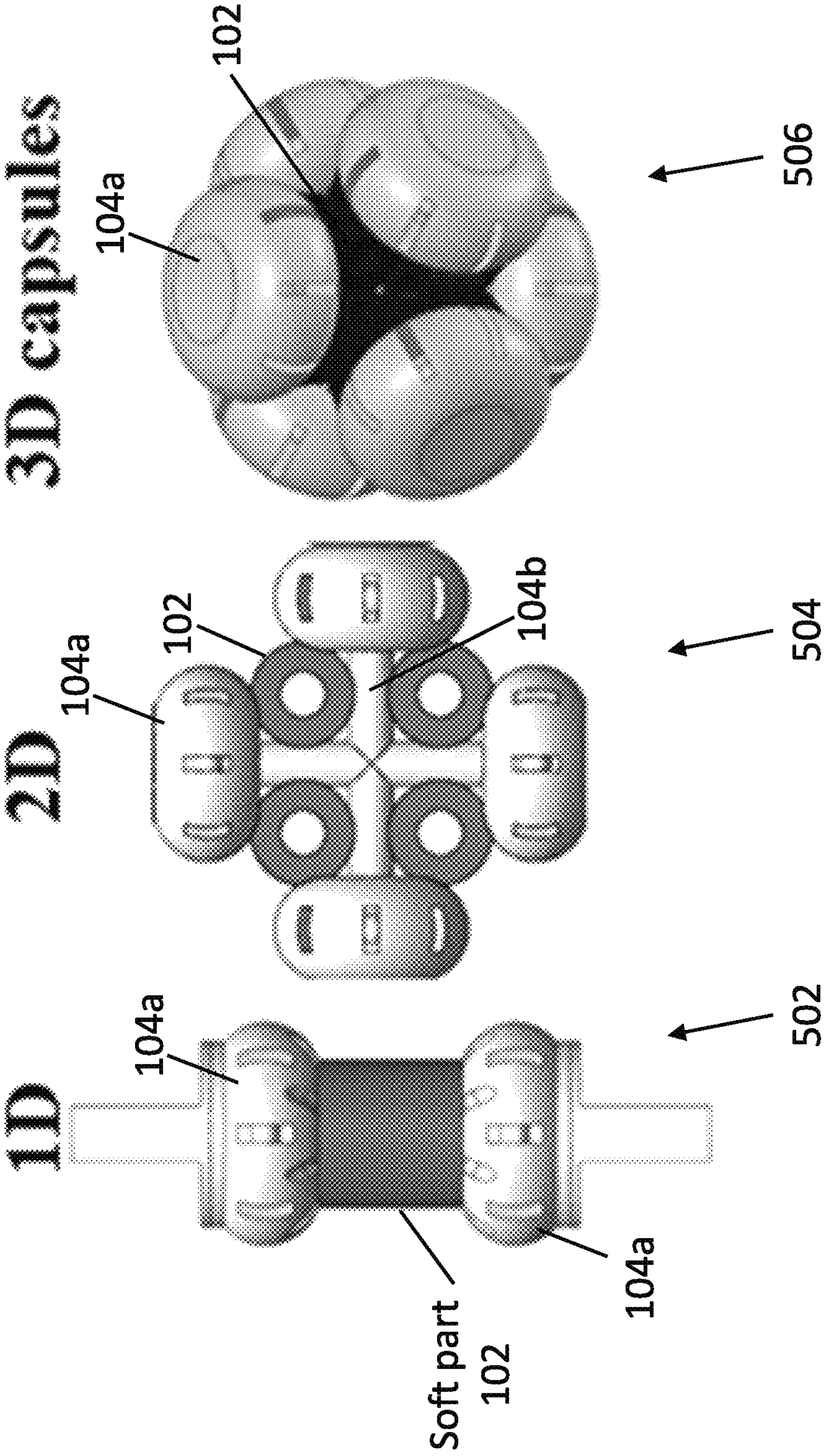
FIG. 5A is a schematic view of 1D, 2D, and 3D meta-capsules, in accordance with the present disclosure.
Figure 5B:
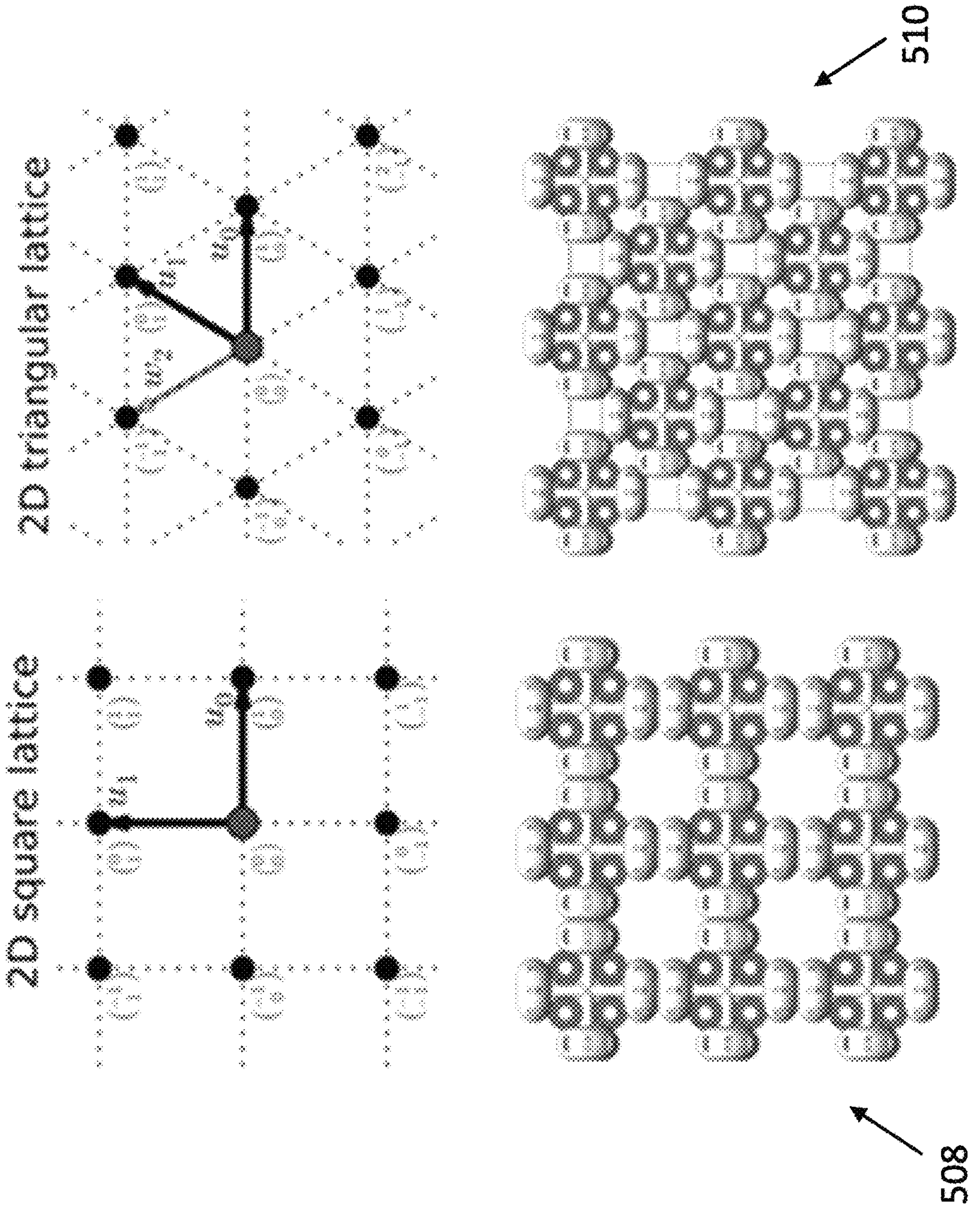
FIG. 5B is a schematic view of exemplary arrangements of 2D meta-capsules, forming a 2D AMM, in accordance with the present disclosure.
Figure 5C:
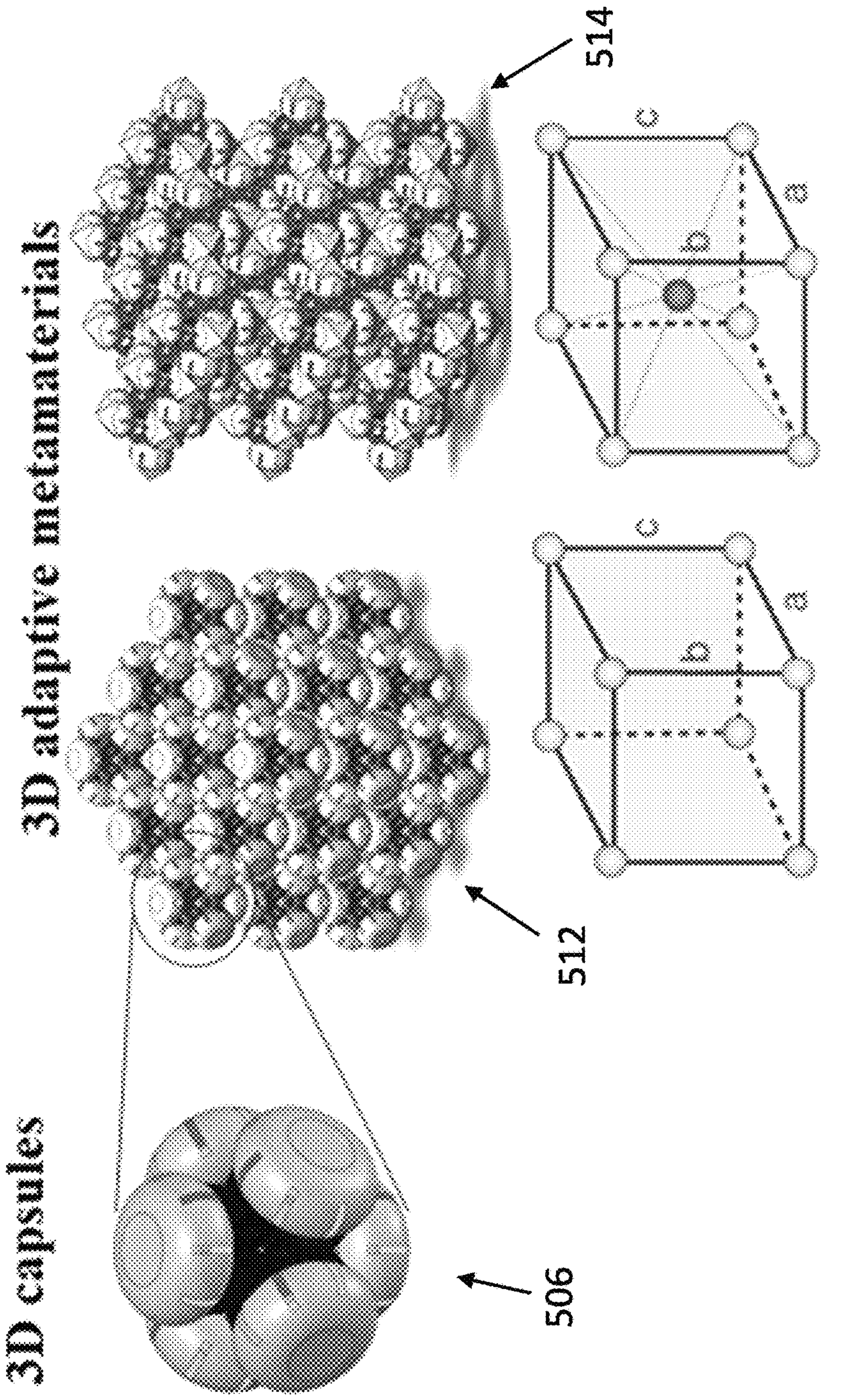
FIG. 5C is a schematic of exemplary arrangements of 3D meta-capsules, forming a 3D AMM, in accordance with the present disclosure.
Figure 5D:
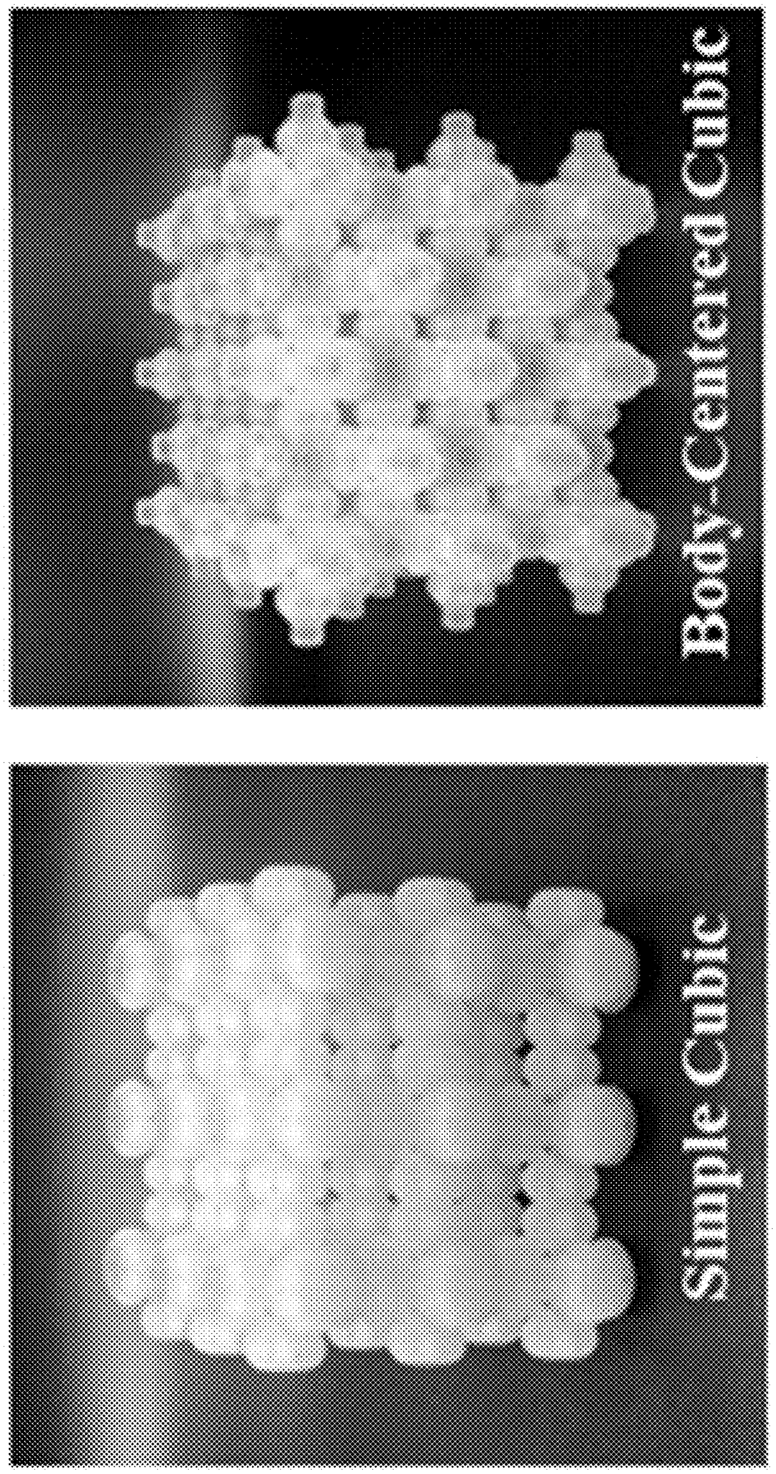
FIG. 5D is a view of 3D-printed two-phase 3D AMMs, forming a 3D AMM, in accordance with the present disclosure.

2D and 3D AMMs are each formed of a plurality of 2D and 3D meta-capsules, respectively. As shown in FIG. 5A, 2D 504 and 3D meta-capsules 506 are formed by repeating the 1D capsule design 502 in orthogonal directions. The soft part in the 1D capsule can be replaced by compliant circular rings. For the 2D design, four rings can be used to connect the hard parts in both directions (e.g., in an XY-plane). For the 3D design, eight rings can be used to connect the hard parts in three directions. The 2D and 3D capsules can be arranged via lattices (e.g., Bravais lattices). 2D AMMs can be arranged via 2D square lattices 508 or 2D triangular lattices 510 (e.g., as shown in FIG. 5B). 3D AMMs can be arranged via simple cubic 512 and body-centered cubic lattices 514 (e.g., as shown in FIGS. 5C and 5D).

Each meta-capsule (1D, 2D, and 3D meta-capsule) comprises a plurality of hard parts (e.g., hard parts 104*a*, 104*b*, 104*c*) and a plurality of elastically deformable soft parts 102 coupled to the plurality of rigid parts. At least a subset of the meta-capsules undergo a reconfiguration under an applied stress (tensile stress, compressive stress, and/or shear stress). The reconfiguration is a transition between a first (initial) state to a second state. In the second state, the soft parts of the subset of meta-capsules deform, causing a reduction in the gap(s) between adjacent rigid parts of the meta-capsules in the subset, thereby increasing a stiffness of the AMM when the adjacent rigid parts come into contact. When the applied stress is removed, the meta-capsules return to the initial state, thereby decreasing the stiffness.

The 2D capsule can be formed of a plurality of rigid parts which include a first rigid part 104*b* formed by a pair of coplanar perpendicular members intersecting at a point. The pair of coplanar members having four ends, with each end positioned within one of four second rigid parts 104*a*. Each second rigid part has an opening leading to an interior cavity. Each of the soft parts 102 can be bonded to the first rigid part 104*b* and two second rigid parts 102, with each second rigid part 102 bonded to two soft parts 102.

The 3D capsules can be formed from the 2D capsules. The first rigid part 104*b* can further include a member intersecting at the point. The member can be perpendicular to the pair of coplanar members and having two ends, with each end of the member positioned within one of two second rigid parts 104*b*. Each of the soft parts 102 can be bonded to the first rigid part 104*b* and two second rigid parts 104*a*.

Figure 5E:
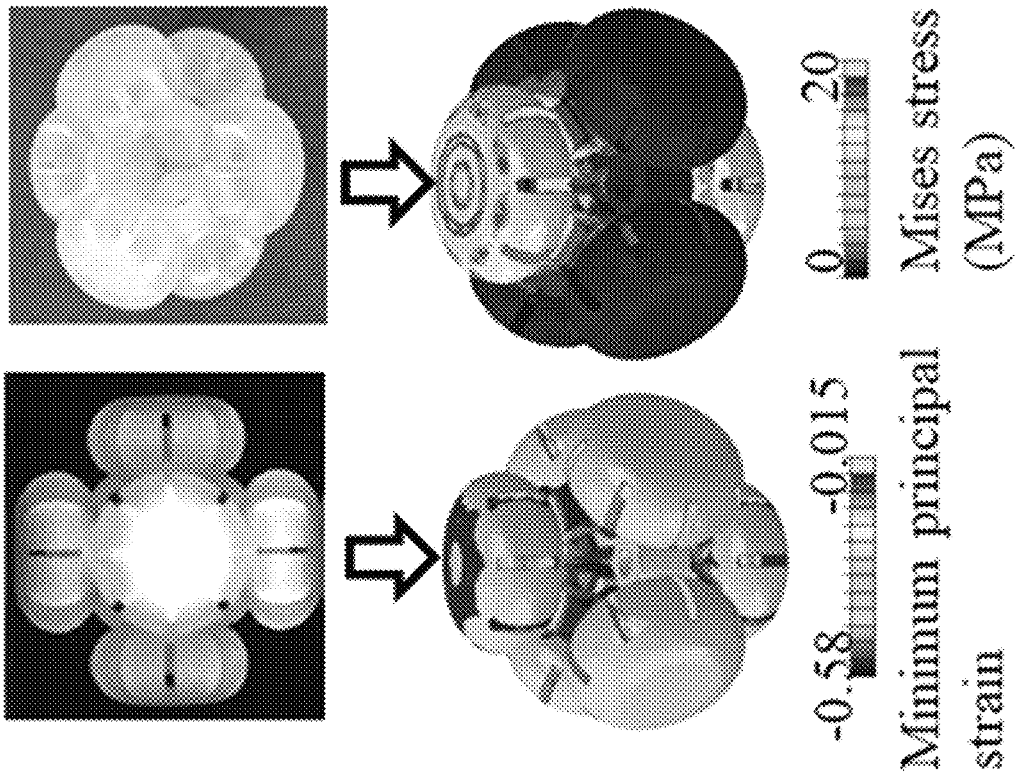
FIG. 5E is a diagram of finite element simulations of 3D-printed two-phase 3D meta-capsules, in accordance with the present disclosure.
Figure 5F:
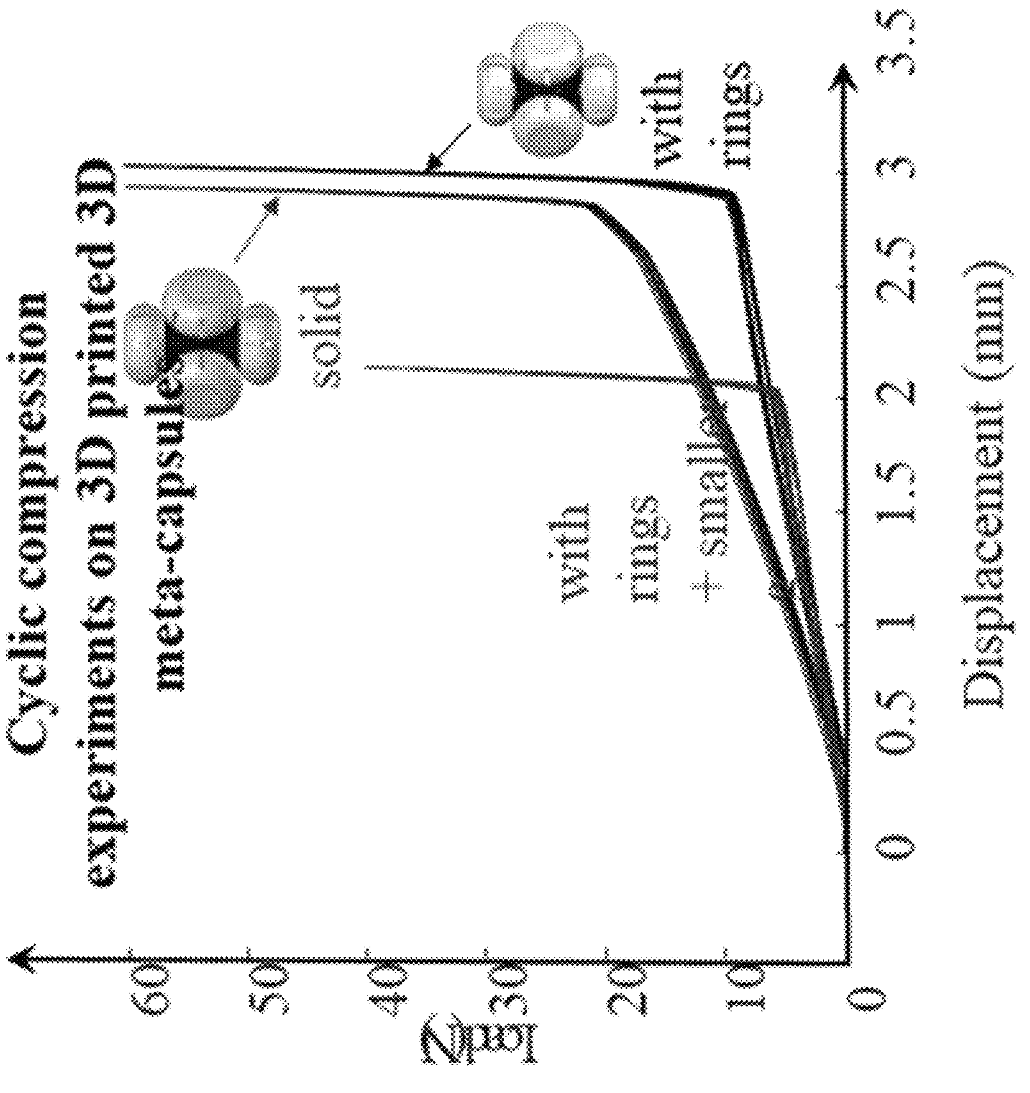
FIG. 5F is a graph of load and displacement for 3D-printed two-phase 3D meta-capsules under cyclic compression, in accordance with the present disclosure.

FIGS. 5E and 5F are a diagram and graph of experiments performed on printed meta-capsules, respectively, showing bi-modulus behavior. The 3D meta-capsules and AMMs are orthotropic, and the constitutive relations can be quantified.

In general, for each capsule, the state tensor $\phi_{kl}(\varepsilon_{kl}, \varepsilon_{kl}^*)$ is defined as $$\phi_{kl} = \begin{cases} 0, & \varepsilon_{kl} < \varepsilon_{kl}^* \\ 1, & \varepsilon_{kl} \geq \varepsilon_{kl}^* \end{cases}.$$

For a given state, the constitutive relation of the periodic AMM is orthotropic:

$$[\sigma_{ij}] = \left[S_{ijkl}^{\phi_{kl}}\right][\varepsilon_{kl}](i, j, k, l = 1-3), \tag{1}$$

where, $[\sigma_{ij}]$ is the stress tensor; $[\varepsilon_{kl}]$ is the strain tensor and $$\left[S_{ijkl}^{\phi_{kl}}\right]$$

is the stiffness tensor. Each component of $\varepsilon_{kl}^*$ can have two different values based on the sign (direction) of loading. For example, the threshold strain values for tension and compression can be different. This indicates that for 1D bi-modulus meta-capsules (either tension, compression, or shear), there are two values of threshold strains; for 2D bi-modulus meta-capsule, there are six or eight values of threshold strains (tension compression in each of the two directions, and shear in two opposite directions (e.g., as shown in FIGS. 3C and 3D). Some 2D and 3D bi-modulus meta-capsules can have twelve values of threshold strains.

The threshold strain tensor $\varepsilon_{kl}^*$ can be analytically calculated based on the kinematics of the bi-modulus meta-capsules. The kinematics related to the fourteen Bravais lattices can be used to derive a relationship between the stress-strain relation of a single capsule and that of the corresponding mechanical metamaterial with a certain Bravais lattice structure. Finite element (FE) simulations can be used to verify the analytical. Thus, the influences of the capsule orthotropy and lattice structure on the effective mechanical properties of the AMM can be systematically evaluated.

For each value of $\varepsilon_{kl}^*$, two stiffness matrices $$\left[S_{ijkl}^{\phi_{kl}}\right]$$

can be obtained numerically via FE simulations on a single meta-capsule model under a certain basic strain before contact and after contact, respectively. Both the threshold strains $\varepsilon_{kl}^*$ and stiffness matrix $$\left[S_{ijkl}^{\phi_{kl}}\right]$$

are a function of the geometric parameters of the meta-capsule and the effective mechanical parameters of the hard and soft components, including g, R, $E_h$, $E_s$, $A_r$, $A_c$, and ring dimensions etc. By applying periodic boundary conditions (PBC), systematic FE simulations can be used to inversely solve for the components in the effective stiffness matrix of the corresponding AMM.

For simplicity, the meta-capsules can be assumed to be isotropic with only two states when responding to von-Mises stress or equivalent strain, instead of responding to each strain component. In this way, the simplest cellular automaton (CA) model of the AMM can be obtained. For such a simple CA model, an adaptive finite element scheme was developed by using a Finite Element software and a Python script of the simplest CA for iteration.

Figure 6A:
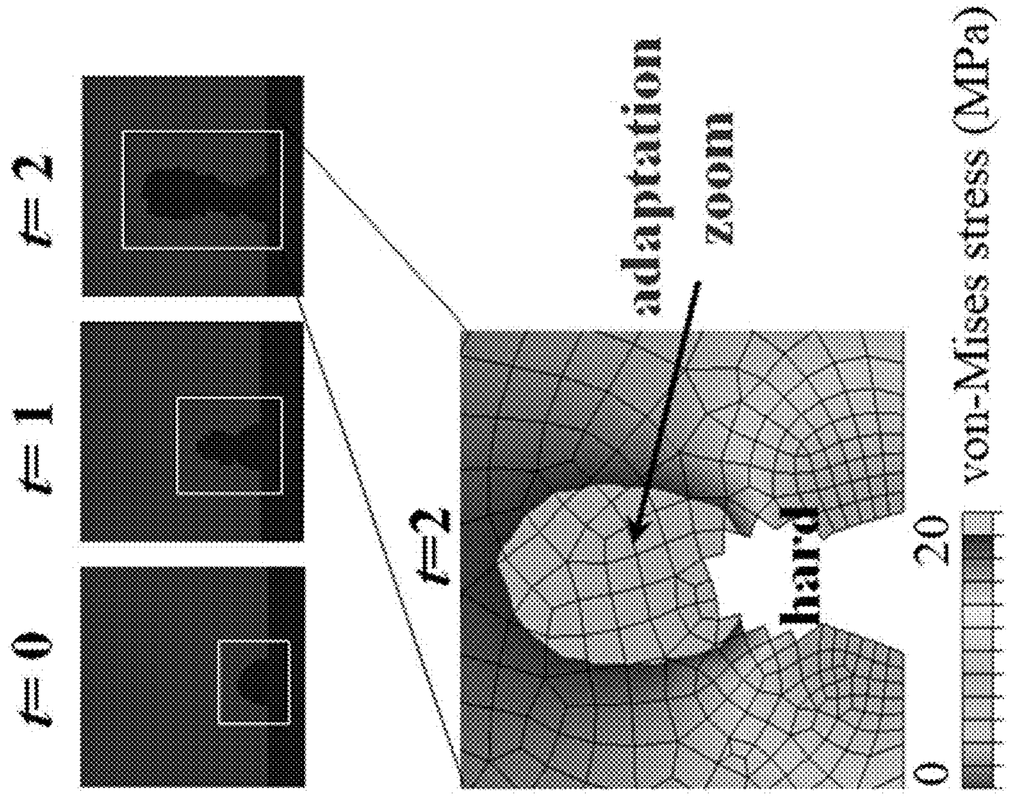
FIG. 6A is a diagram of adaptive finite element simulations for a binary cellular automaton type AMM, illustrating additive adaptation at the soft-hard interface, in accordance with the present disclosure.
Figure 6B:
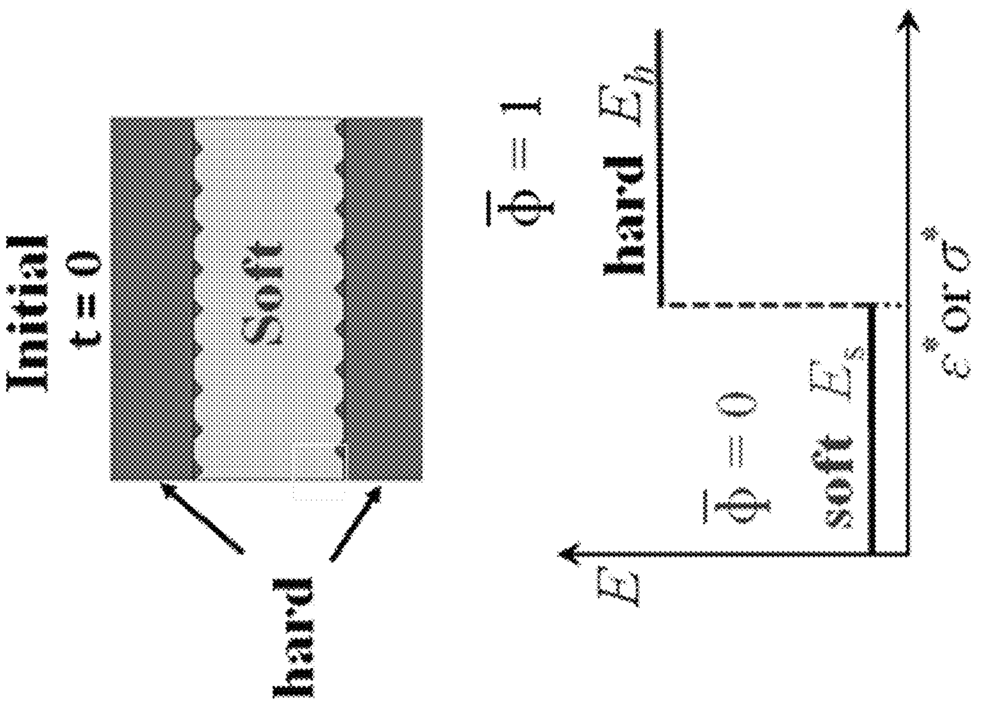
FIG. 6B is a diagram illustrating bi-modulus adaptation, in accordance with the present disclosure.
Figure 6C:
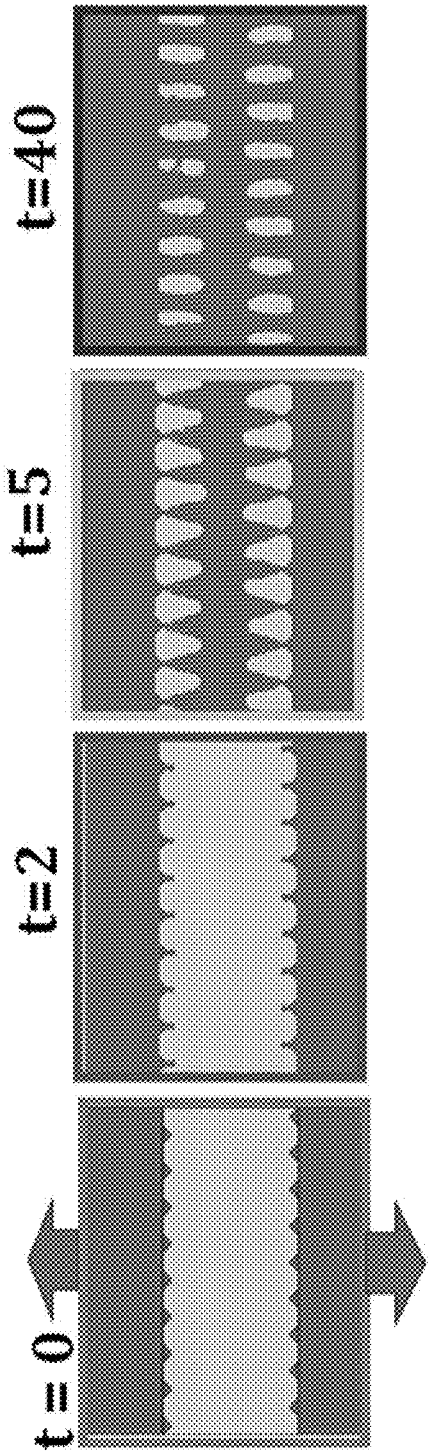
FIG. 6C is a diagram illustrating exemplary adaptation patterns at different time steps obtained via adaptive finite element simulations, in accordance with the present disclosure.

A series of FE simulations were performed on a two-phase field with intimal imperfections along an interface. Since the capsule is strain responsive, for a non-uniform strain field, stress/strain concentration is the driving force for adaptation. Each capsule was modeled as one element. Thus, when local equivalent strain reached the threshold, bi-modulus behavior was triggered and the element experienced an immediate increase in modulus, as shown in FIG. 6A, causing a redistribution of the stress and cycle started. When strain in unchanged elements went under the threshold, the simulation stopped and the results at the final time step represented the final adaptation pattern. FIGS. 6B and 6C are diagrams illustrating adaptation patterns at different time steps (t=0, 2, 5, and 40) obtained via finite element simulations. FIG. 6B shows that the adaptation pattern becomes stable after t=40.

Figure 7:
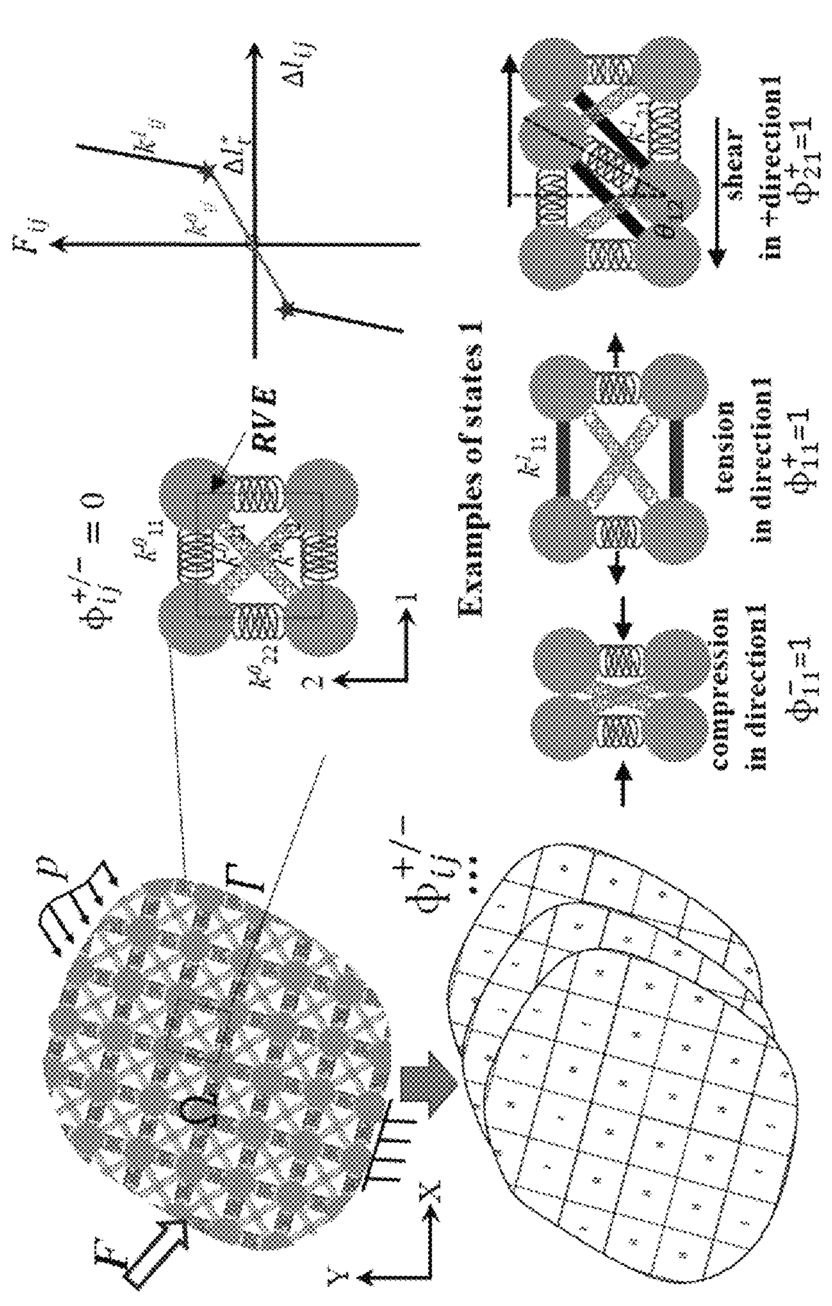
FIG. 7 is a schematic of the particle-spring cellular automaton model of AMM, in accordance with the present disclosure.

Different approaches such as multi-material optimization approaches and machine learning can be used to optimize traditional two-phase composites. For example, a SIMP-like multi-material interpolation model can be used under the framework of the element-based topology optimization method. This concept was extended to N groups of design variables for N-material topology optimization. A multi-material topology optimization method was developed by splitting the problem into a series of binary phase topology optimization sub-problems. Machine learning was used to generate optimal designs and predict mechanical properties including toughness and strength. Model AMM is beyond spatial topological optimization, due to the adaptivity, a dummy time scale is added, therefore, solving the optimal adaptation of AMM becomes a problem of spatiotemporal optimization with a vasty design space. Multistate CAs can have more than two states allowing for a wider range of possible cell configurations (e.g., FIGS. 3C-3E). The number of states N in a CA model is a crucial parameter that can significantly affect the behavior and complexity of the system. To set up the CA models, the domain can be discretized into CA grids (e.g., as shown in FIG. 7), with each grid representing a meta-capsule. Thus, the potential energy of the system in continuous form is:

$$\prod = \int_{\Omega} W[\varepsilon(X), \sigma(X, \Phi), \Phi(X, \varepsilon, \varepsilon^*)]d\Omega - \int_{\Gamma} (F \cdot \Delta + p \cdot u)d\Gamma, \tag{2}$$

where, W is the strain energy density function of the continuum, ε(X), σ(X, Φ) are the strain and stress tensors at each location, Φ is the state function, and ε* is the threshold strain tensor. The state function Φ is also a second order tensor, since in general each strain component has a threshold value. Each component of Φ has two values 0 or 1. F is external force vector, and Δ is the corresponding displacement vector; p is the surface traction, and u is the corresponding displacement. Ω represents the entire domain and Γ represents the boundaries.

To further discretize Equation 2, the meta-capsules can be modeled as particles with a finite size connected by bi-linear springs, as shown in FIG. 7. In the 2D case, for example, each spring can have bi-stiffness. Under tension, the bi-modulus behavior of the meta-capsule is represented by the bi-stiffness of the springs in horizontal and vertical directions, while under compression, the bi-modulus behavior of the meta-capsule is represented by the contact between the neighboring particles in the loading direction. Under shear, the bi-modulus behavior of the meta-capsule is represented by the bi-stiffness of the springs along the diagonal directions. Some of the deformations may be coupled for bi-modulus meta-capsules. In the CA model, this effect can be reflected via constraint equations. For example, during shear, the maximum rotation angle is constrained by the contact between particles, as shown in FIG. 7. Thus, Equation 2 can be discretized as:

$$\prod = \frac{1}{2}\sum\left(k_{ij}^{\Phi_{ij}^{+/-}} \Delta l_{ij}^2\right)_{\Omega} - \sum F \cdot \Delta_{\Gamma} - \sum (p \cdot \Delta u_{ij})_{\Gamma}. \tag{3}$$

The equilibrium configuration of the discrete system can be obtained by taking ∂Π/∂Φ=0. Critical threshold strain for various Wolfram Classifications can be obtained via solving $\partial^2\Pi/\partial\Phi^2=0$. The strain compatibility equations, together with the equilibrium equations, define the interaction rule of the CA grids. The system of equations can be discretized to get the interactive rule for the CA model.

The influence of the number of states on CA models can be significant: More states generally lead to a greater diversity of patterns and behaviors that can emerge in the CA. CAs with a large number of states can be computationally intensive to simulate, especially for large grids and extended time steps. To achieve flexibility and computational efficiency, Golly, an open-source CA software, was used to develop the CA model for multi-state AMMs. Designing AMMs can involve simulating large-scale CA models to study how the structure responds to various conditions and stimuli. Custom rules representing the interactions of the metamaterial's components were developed to model the behavior of AMMs.

Figure 8A:
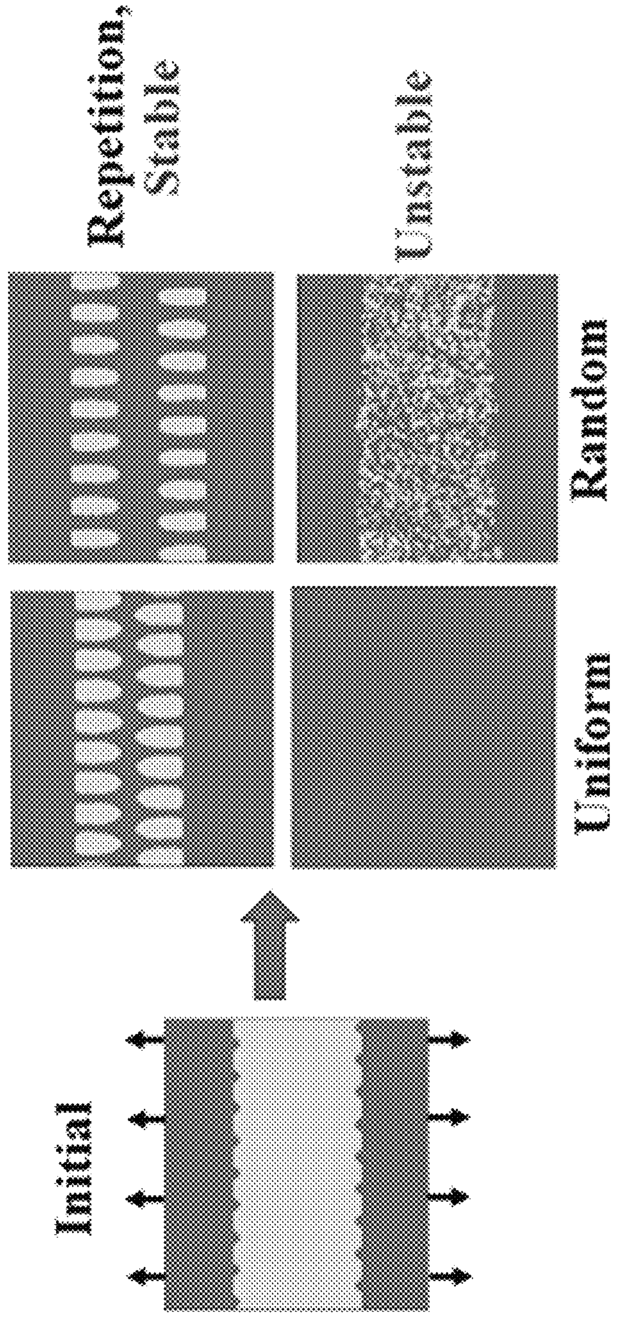
FIG. 8A is a diagram of stable and unstable patterns obtained from the adaptive finite element simulations of the binary cellular automaton type AMM, in accordance with the present disclosure.

CA behaviors were categorized into four classes: Class 1: Converge quickly to a uniform state; Class 2: Converge quickly to stable or periodic structures; Class 3: Chaotic aperiodic behavior; and Class 4: Complicated localized structures. Adaptive FE simulations of binary AMMs exhibited Class 1-3 behaviors (shown in FIG. 8A). Aside from normal stable patterns, in some parameter space, the adaptation led to a uniform pattern, i.e. all grids went to state 1; in some parameter space, random patterns were obtained.

Figure 8B:
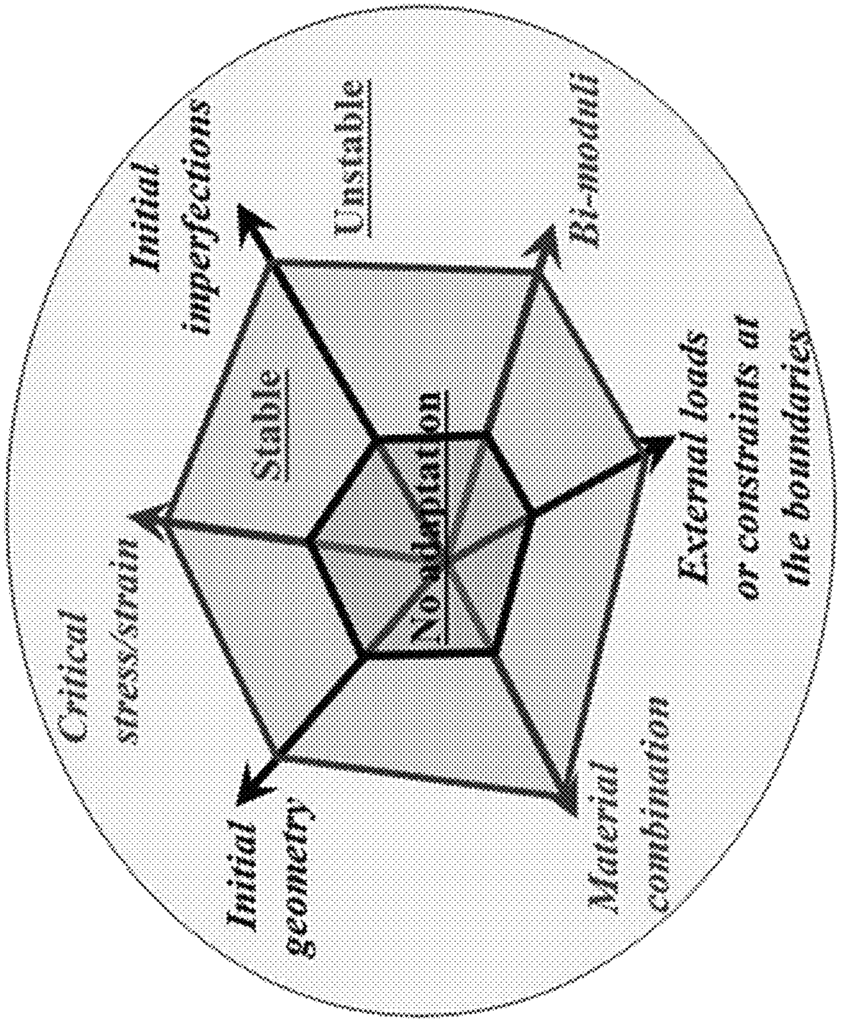
FIG. 8B is a schematic of the design space and stability of the adaptation, in accordance with the present disclosure.

Critical threshold strain values are relevant for the stability of the system. Various Wolfram Classifications can be identified by solving $\partial^2\Pi/\partial\Phi^2=0$. The design space for stable patterns can be identified. The adaptation may depends on several key parameters of two categories (shown in FIG. 8B): external factors, the external load or constraints; loading frequency and history; physical constraints; and intrinsic factors of the capsules such as critical stress/strain for adaption, bi-moduli, and material combination. Depending on the range of each parameter, stable, unstable, and no adaption may occur. After stable adaptation, stress-concentration may be reduced, indicating a higher overall strength, toughness, and more efficient usage of materials.

Figure 9:
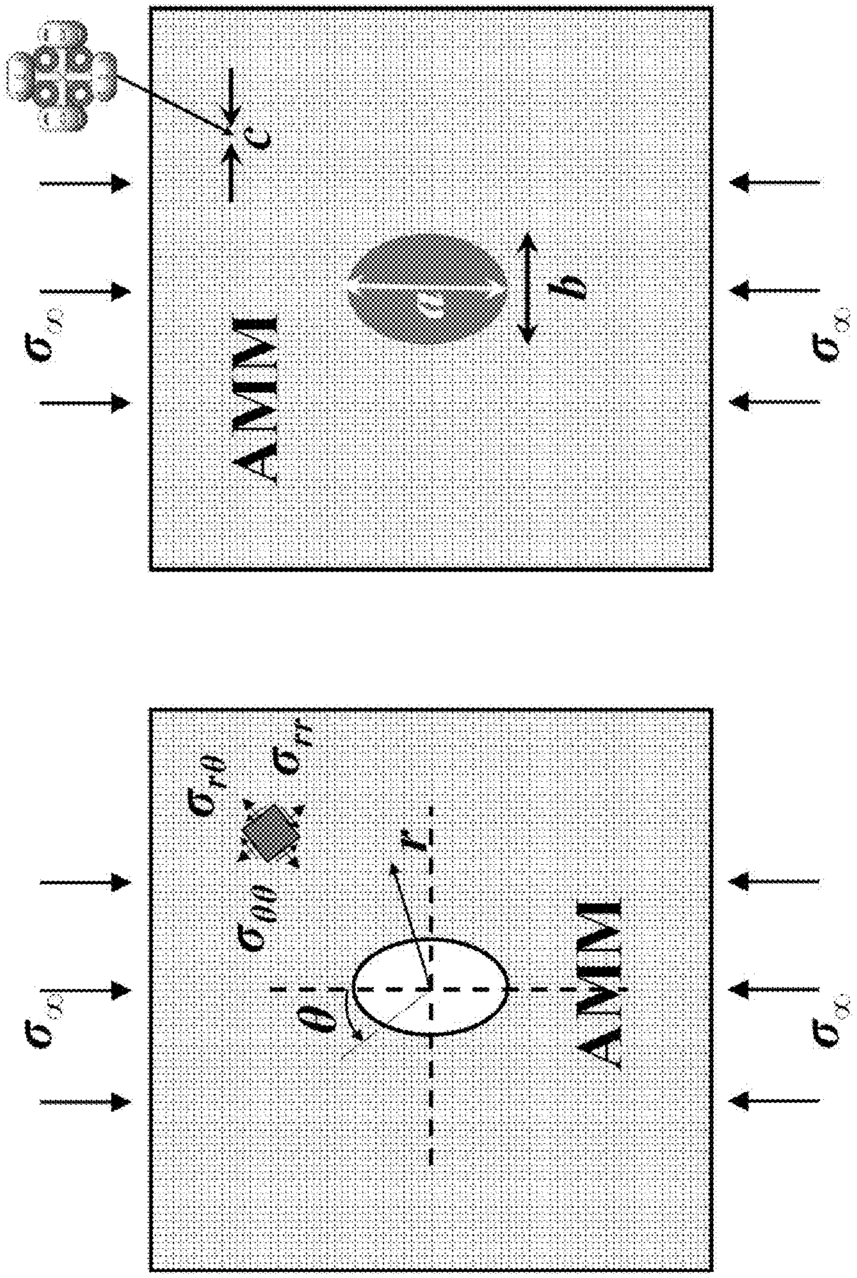
FIG. 9 is a diagram of two benchmark studies, in accordance with the present disclosure.

For isotropic linear elastic conventional (non-adaptive) materials, stress/strain field and concentrations around elliptic void and inclusions are classic mechanics problems with closed form solutions. Two benchmark studies (shown in FIG. 9) were used to explore the effects on a material that is formed into an AMM. The results provided insights on 2D (Planar) adaptation of AMM. Results demonstrated that the two benchmark cases (Inglis's solution and Eshelby's inclusion) are distinct. For the elliptic-hole case, the results suggested that uniform adaptation can reduce stress concentration. For the elliptic-inclusion case, results suggested that uniform adaptation (i.e., the same adaptation criteria at different locations) can increase stress concentration instead and require spatially varied adaptation. The ratio between the bi-moduli can influence the adaptation pattern. In a certain length scale (c/a), the AMM may not be sensitive to capsule size c. Anisotropy of AMM may influence the planar adaptation.

Both adaptive FE simulations for binary AMM and multistate CA model for multistate AMM around the elliptic hole were performed by varying the design parameters, including the ellipticity ratio of the hole a/b, the ratio between the bi-moduli, the scale factor c/a, and the anisotropy of AMM. The anisotropic constitutive model obtained was used. An empirical model was generated for predicting stress concentration factor of AMM around elliptic hole for AMM with different state number N. Based on the classic Inglis's solution, the following empirical model is shown for predicting the stress concentration factor of adaptive mechanical metamaterial with elliptic holes, by introducing a labeling function $f([\varepsilon^*], [S], c/a)$:

$$K_t = \frac{\sigma_{max}}{\sigma_\infty} = 1 + 2\frac{a}{b}f([\varepsilon*], [S], c/a). \tag{4}$$

If $f=1$, Equation 4 degenerates into the classic Inglis's solution. If $f<1$, it is considered a successful design in the stable zone shown in FIG. 8B, and a smaller value of $f$ is considered a better design. If $f\geq 1$, it is considered a non-successful design. By labeling the simulation data by the value of $f$, the design space can be defined.

After the adaption, under a certain overall displacement at the boundary, the stress-concentration factor can be reduced to a desired level. The influences of the critical strain tensor for adaptation, the stiffness tensor, and the element size (i.e. capsule size) on the final adaption pattern and the stress-concentration factor were numerically evaluated and compared with the classic Inglis's solution.

Figure 10:
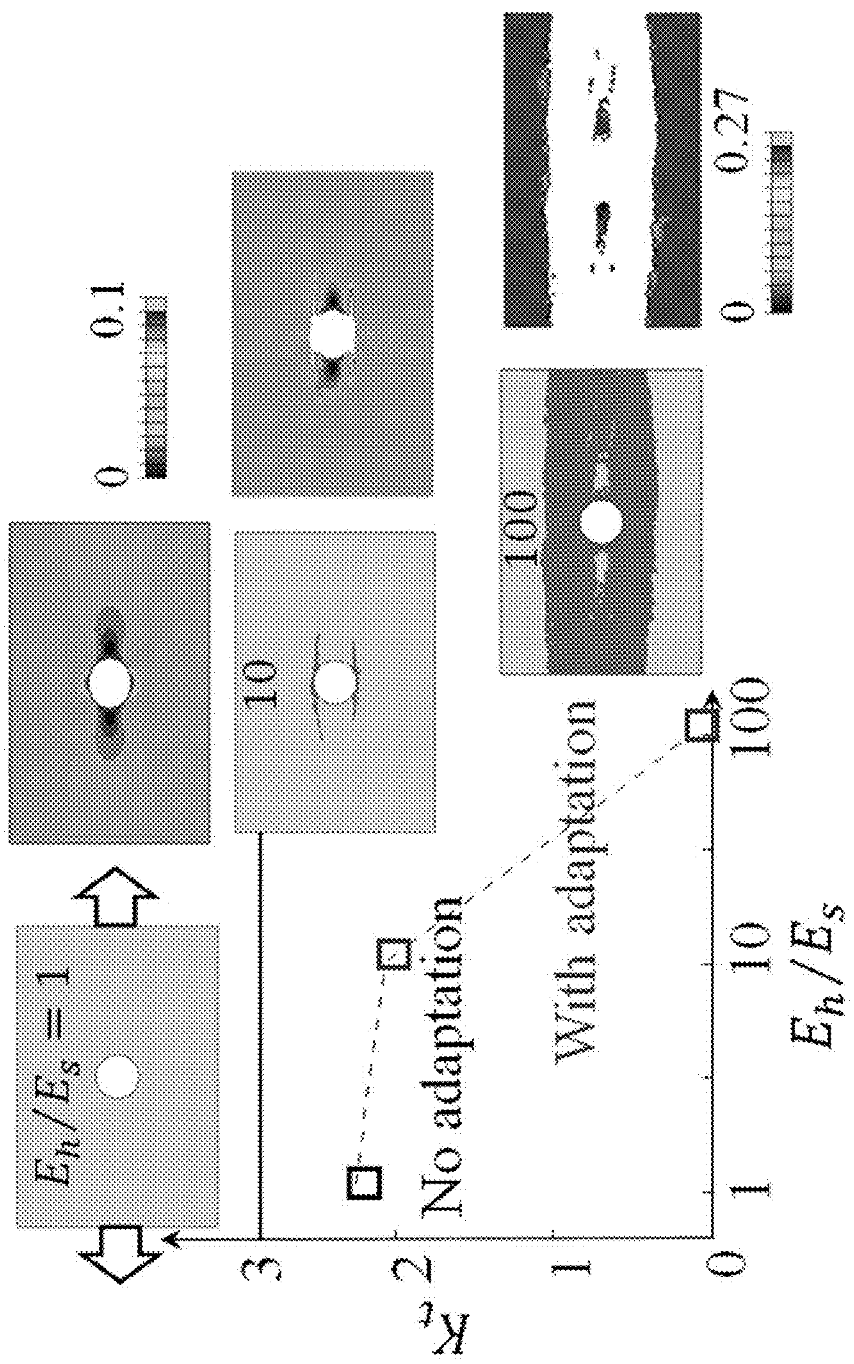
FIG. 10 is a diagram of adaptive finite element simulations for bi-modulus isotropic linear elastic materials with varying bi-modulus ratio, in accordance with the present disclosure.
Figure 11:
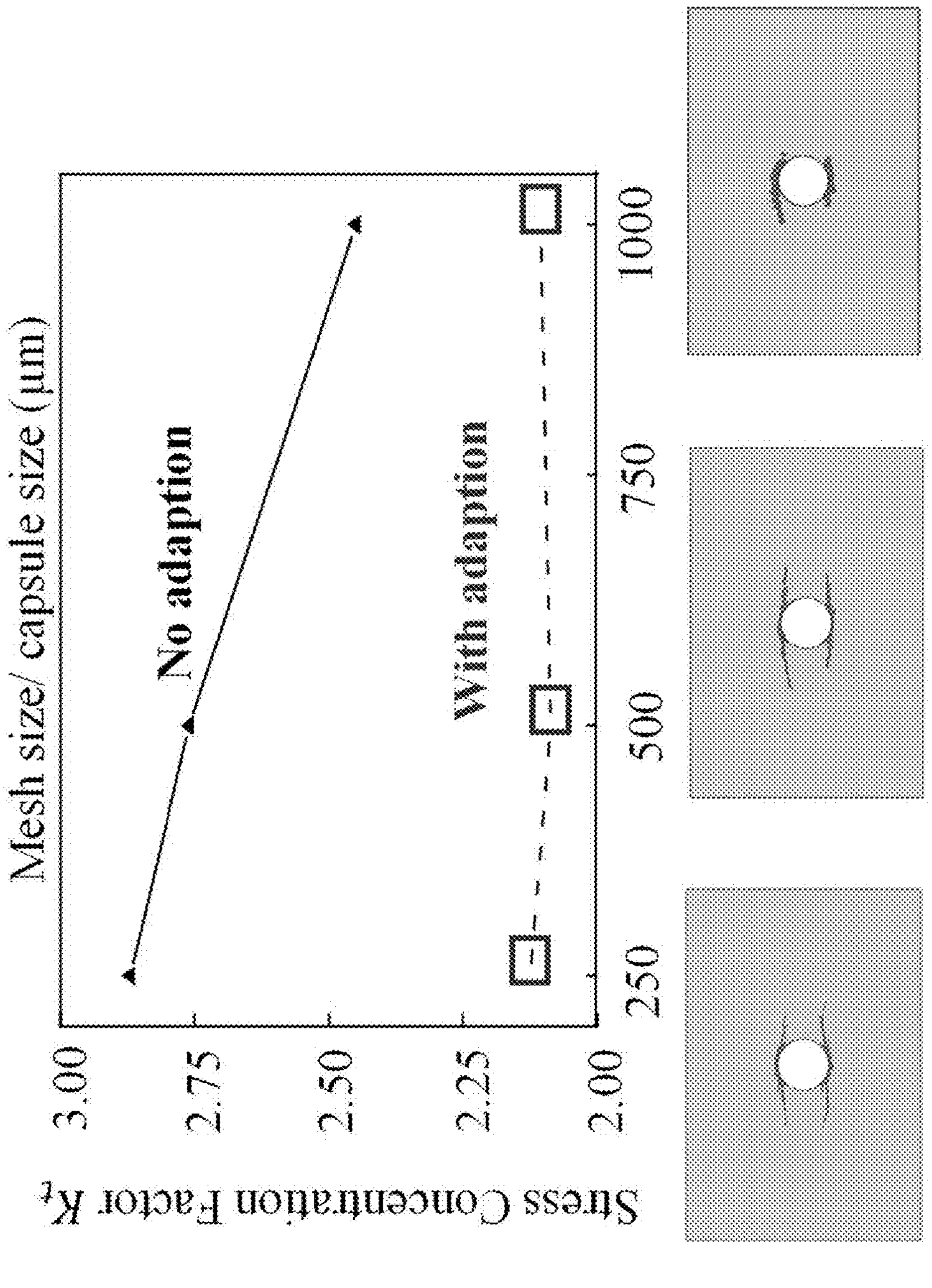
FIG. 11 is a diagram of adaptive finite element simulations for bi-modulus isotropic linear elastic materials with varying mesh size, in accordance with the present disclosure.

Adaptive FE simulations for bi-modulus isotropic linear elastic materials were performed by varying the bi-modulus ratio $E_h/E_s$ (shown in FIG. 10) and the mesh size (shown in FIG. 11). The results in FIG. 10 show that the maximum stress concentration factor can be reduced significantly via tuning $E_h/E_s$. FIG. 11 shows that AMMs are scale insensitive in the range explored.

Besides the design parameters in the first benchmark study, the stiffness of the inclusion normalized by the bi-moduli of AMM was investigated. The predicted results were compared with the classic Eshelby's solution. The influence of the adaptation on the stress concentration was evaluated.

Figure 12:
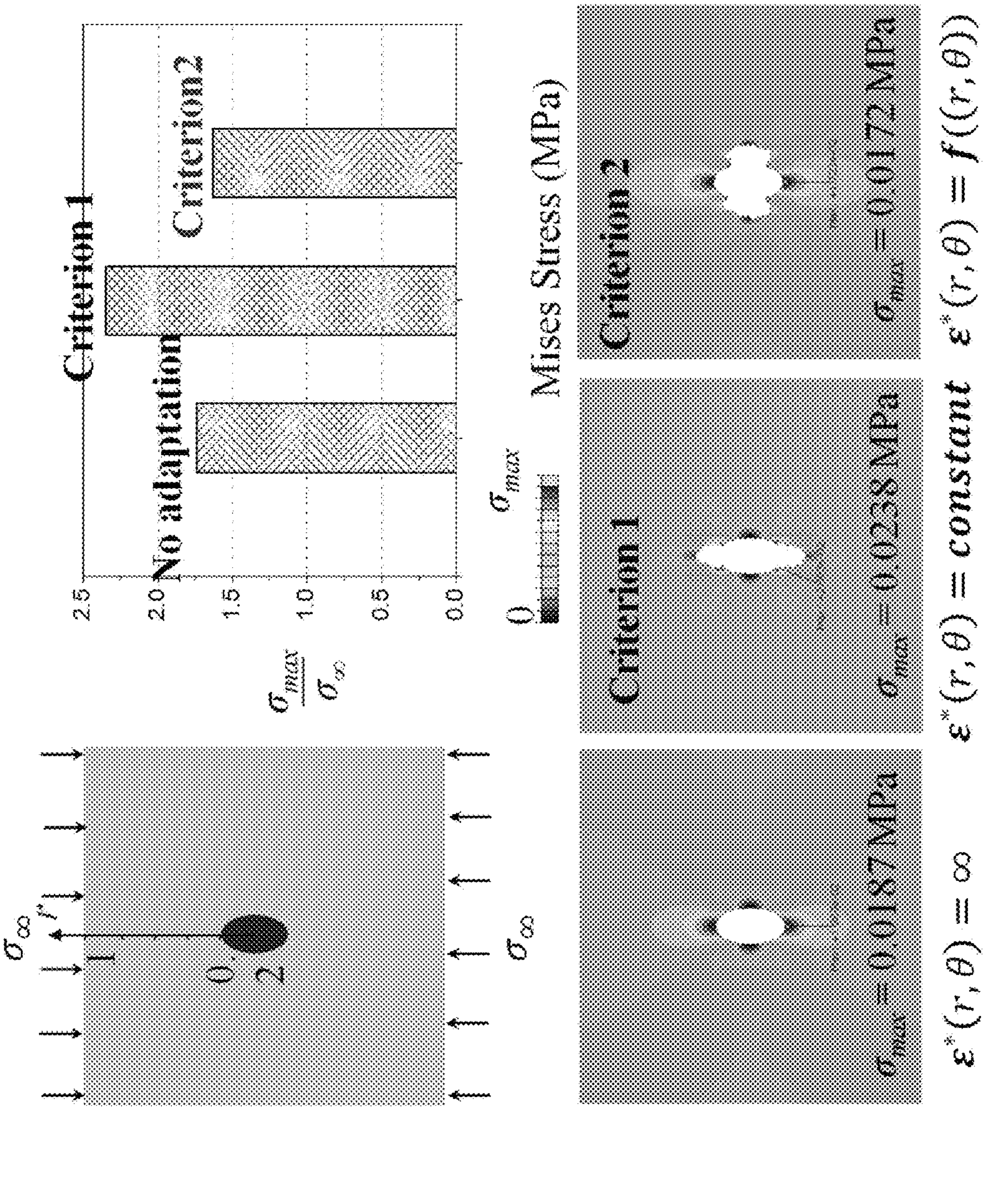
FIG. 12 is a diagram of adaptive finite element simulations for bi-modulus isotropic linear elastic materials with varying adaptation criterion, in accordance with the present disclosure.

Adaptive FE simulations for bi-modulus isotropic linear elastic materials were performed by using two different adaptation criteria: criterion 1, a uniform adaptation criterion, with the threshold strain to trigger bi-modulus is $\varepsilon^*(r, \theta)$=constant, and criterion 2, $\varepsilon^*(r, \theta)=f(r, \theta)$, the threshold strain is proportional to the strain field. After two steps of adaptation, FIG. 12 shows that under criterion 1, the stress-concentration factor increases, while under criterion 2, the stress-concentration factor decreases.

In the CA model, the stress/strain-concentration is the driving force for the adaptation via triggering the bi-modulus behavior of the capsules. Due to the adaptation, the overall stress concentration in the composite materials can be reduced. The final adaptation pattern can be influenced by the initial geometry and the stiffness ratio between the two phases. The adaptation can be either stable or unstable.

Select adapted configurations at different time step were printed via a macro scale multi-material 3D printer. Mechanical experiments were performed to evaluate the overall strength and toughness from the stress strain curves. Digital image correlation (DIC) was used to quantify the strain distribution and therefore the concentration factor.

Figure 13A:
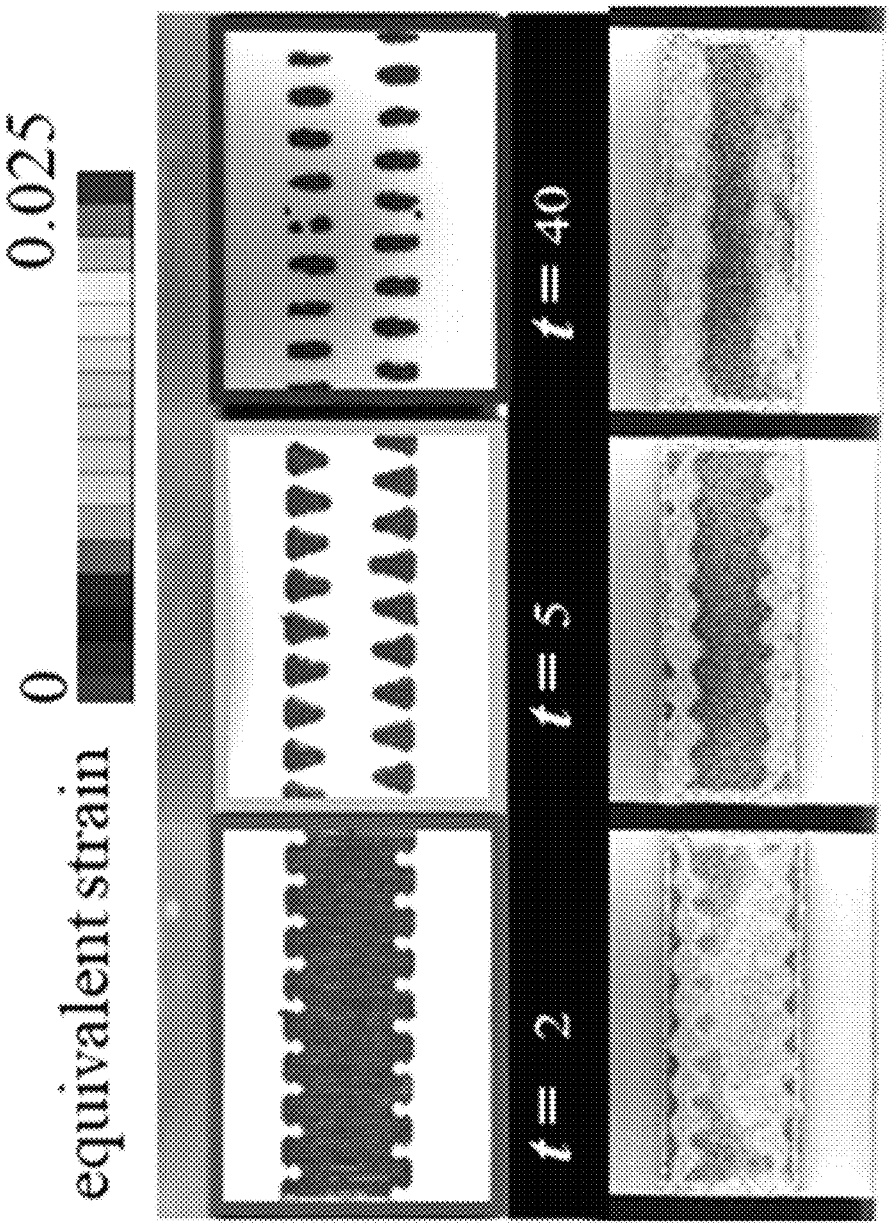
FIG. 13A is a diagram of the adaptation patterns at different time steps obtained via adaptive finite element simulations and the strains contours from digital image correlation for 3D-printed AMM samples, in accordance with the present disclosure.
Figure 13B:
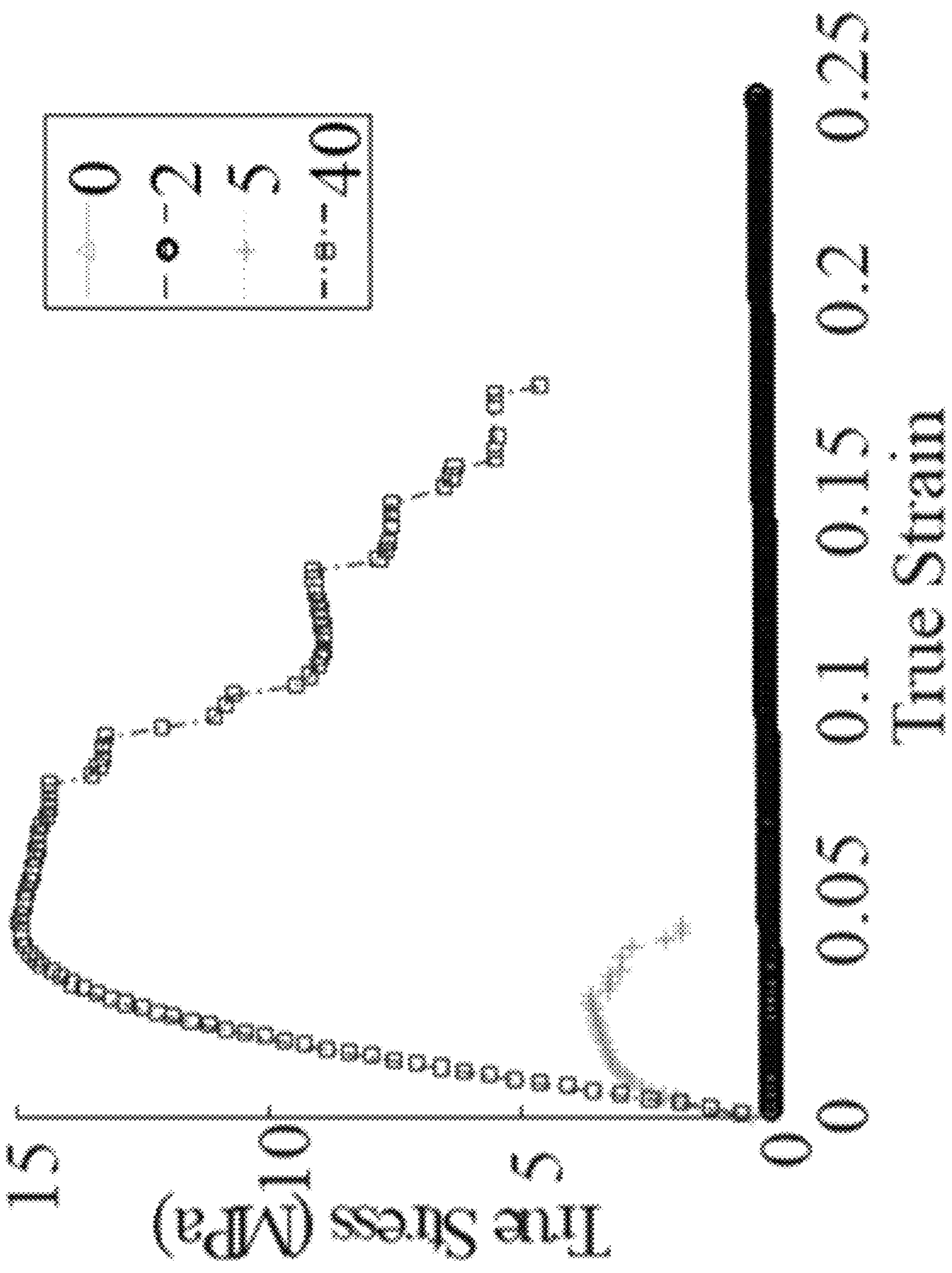
FIG. 13B is a graph of the uniaxial stress-strain curves of the adaptation patterns, in accordance with the present disclosure.
Figure 13C:
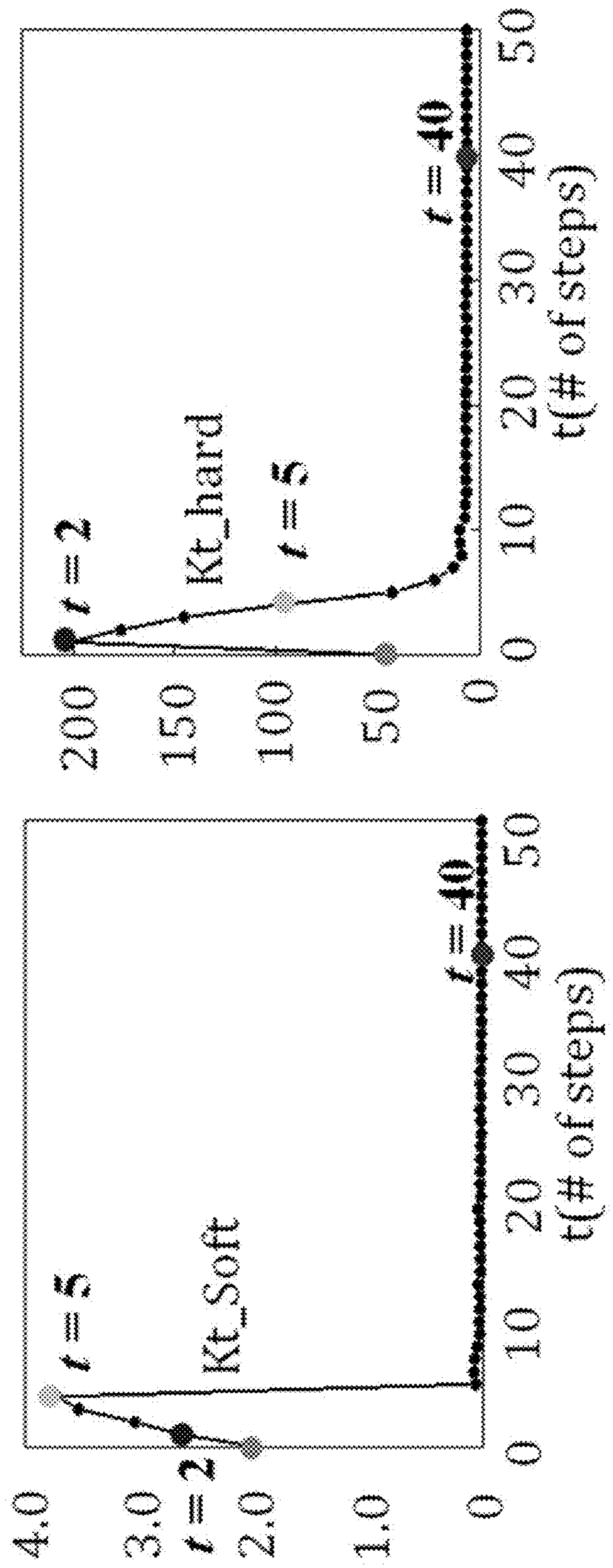
FIG. 13C are graphs of the maximum stress concentration factors in soft and hard regions obtained from finite element simulations, in accordance with the present disclosure.

The adapted patterns at time steps 0, 2, 5, and 40 from FIG. 6C were printed via the macro-scale multi-material printer as shown in FIG. 13A. Uni-axial tension tests were performed, and digital image correlations (DIC) were used to track the strain distribution during the tests. FIG. 13A shows that the strain becomes more uniform after the adapted pattern becomes stable (i.e., at t=40). The effective stress-strain curves are shown in FIG. 13B, the pattern at t=40 performed the best, with the highest stiffness, strength, and toughness. From the adaptive FE simulations in FIG. 6A, the stress concentration factors at each time step were outputted and shown in FIG. 13C. The stress concentration factor increased in the first several cycles and then decreased dramatically below the initial stress concentration and eventually stabilized at a low value.

Figure 14:
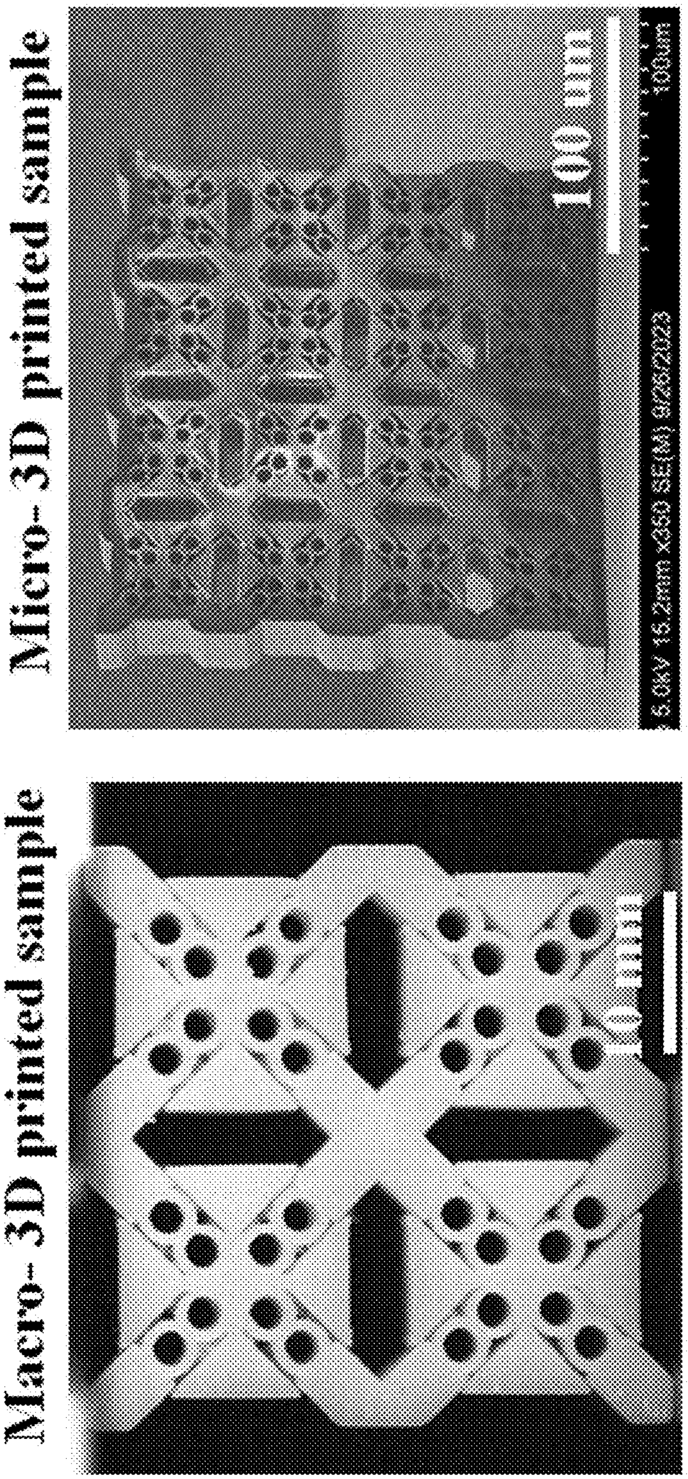
FIG. 14 is a view of macro-scale and micro-scale 3D-printed AMM samples, in accordance with the present disclosure.

Periodic AMMs with multiple meta-capsules were printed at both macro- and micro-scales. Exemplary macro-scale and micro-scale samples are shown in FIG. 14. Uniaxial tension and compression tests were performed on the 3D printed samples. Stress-strain curves were obtained to quantify the bi-modulus behavior of selected designs. FE simulations of one capsule with periodic boundary conditions were performed to compare with experimental results and evaluate boundary effects.

Figure 15A:
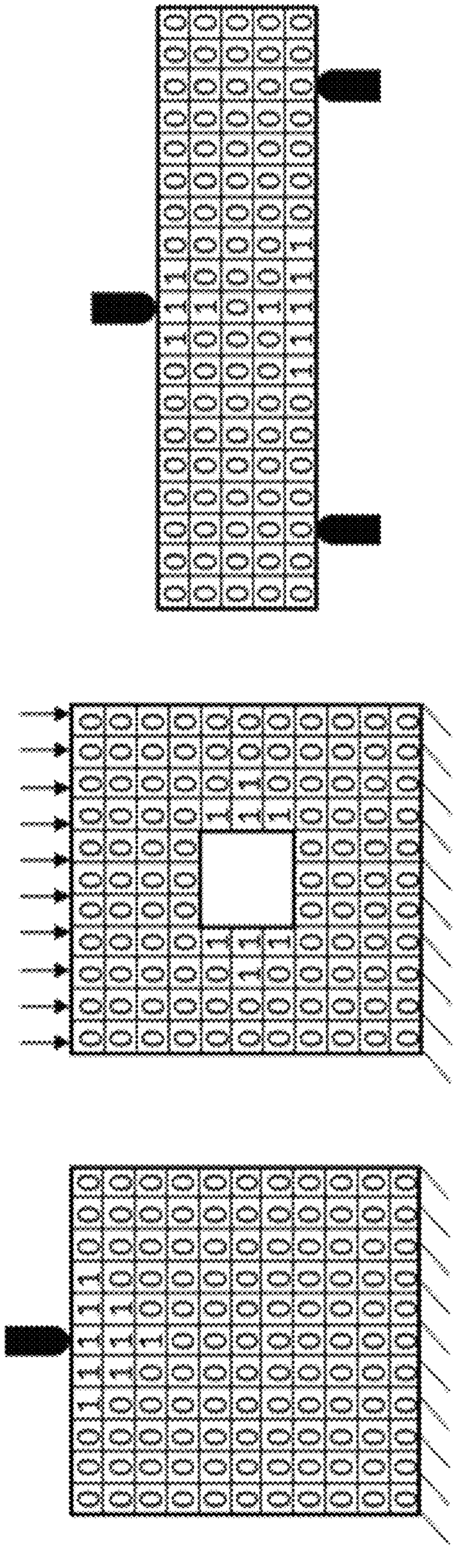
FIG. 15A is a diagram of three benchmark studies, in accordance with the present disclosure.
Figure 15B:
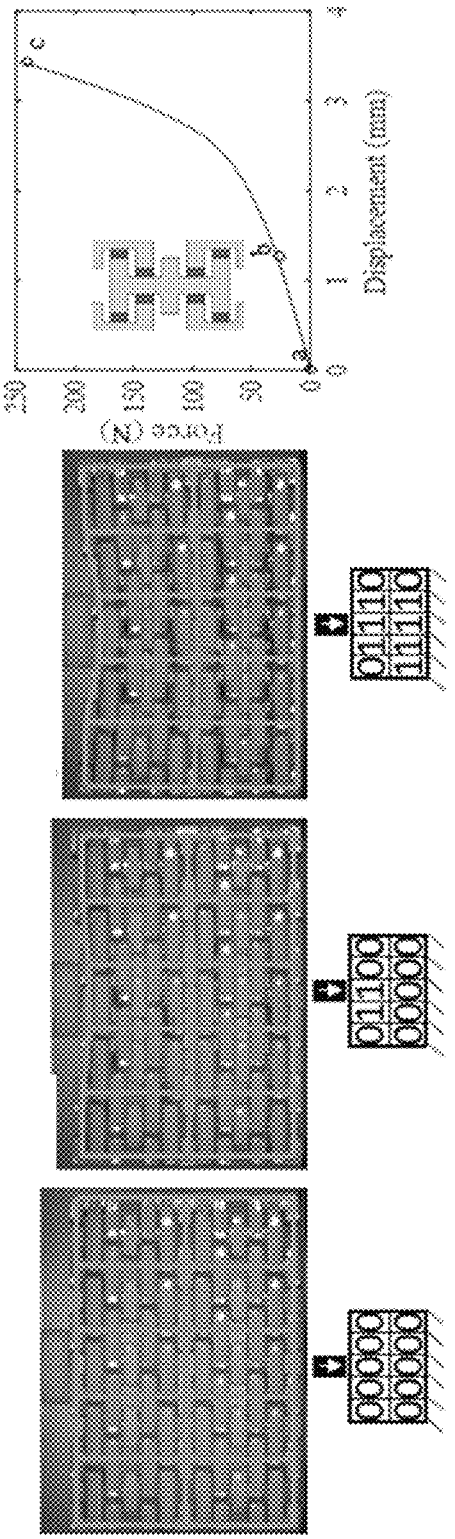
FIG. 15B is a diagram of the results of the three benchmark studies, showing indicators of adaptation for a 3D-printed 3-state AMM, in accordance with the present disclosure.

To evaluate how AMM responds to non-uniform stress/strain field, three benchmark experiments were performed, as illustrated in FIG. 15A: an indentation test, a uniaxial compression test on a sample with a center hole, and a three-point bending experiment. Using 3D printing, indicators were integrated onto the surface of the sample, ensuring that they became visible when the hard components of the capsule made contact. An indentation experiment was performed on a 3D printed AMM (N=3, FIG. 3B). The results are shown in FIG. 15B. The printed indicators clearly showed the evolution of the state of each capsule, which was recorded during the deformation, as well as the load-displacement curves. CA model prediction and FE prediction can be compared with experimental results.

The adaptive bi-modulus design incorporates both hard and soft phases, enabling more efficient energy dissipation and enhancing toughness. Drop tower impact tests were performed on selected macro-scale 3D printed specimens. The load-displacement curves of the AMM and its non-adaptive counterpart were compared under the same impact energy. The peak load, energy dissipation and maximum deflection were quantified and evaluated. For micro-scale samples, compression tests were performed using an in-house setup with varying loading rates to simulate the impact test. Given the small size of the micro-samples, quasi-static loading rates at macro-scale were equivalent to impact tests at the micro-scale. Ball drop tests were also performed to evaluate the impact resistance of the micro-AMM.

Figure 16A:
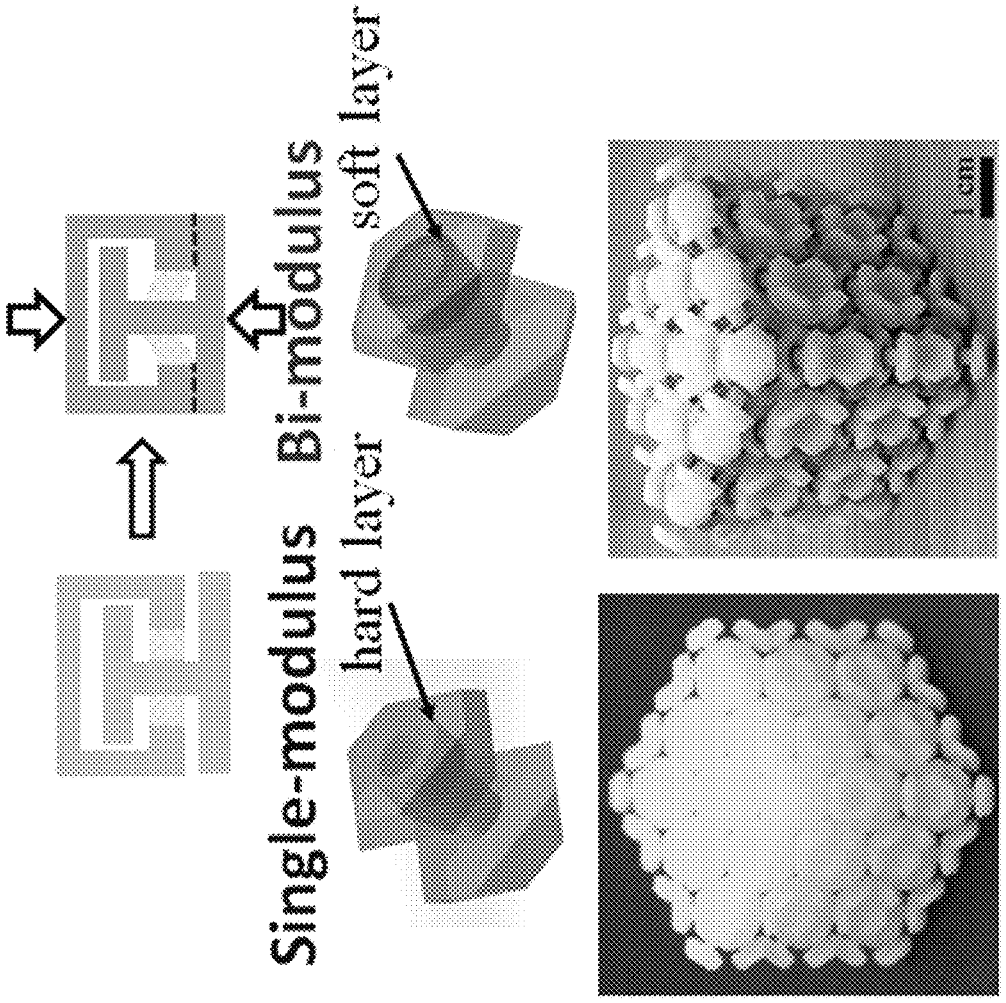
FIG. 16A is a schematic of 3D-printed AMM samples designed with the second mechanism, in accordance with the present disclosure.
Figure 16B:
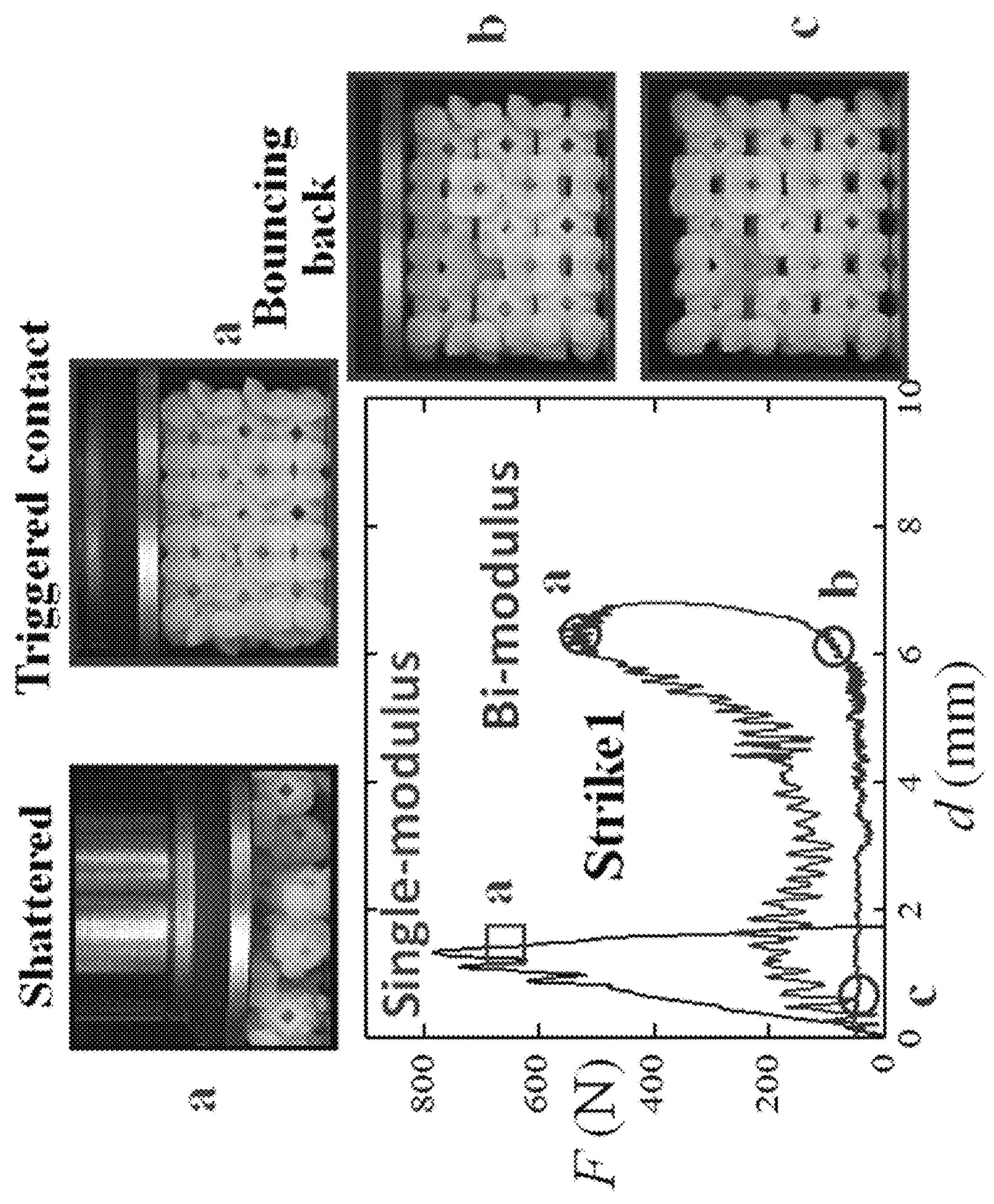
FIG. 16B is a diagram showings views of 3D-printed AMM samples under impact, and their corresponding load-displacement curves, in accordance with the present disclosure.
Figure 16C:
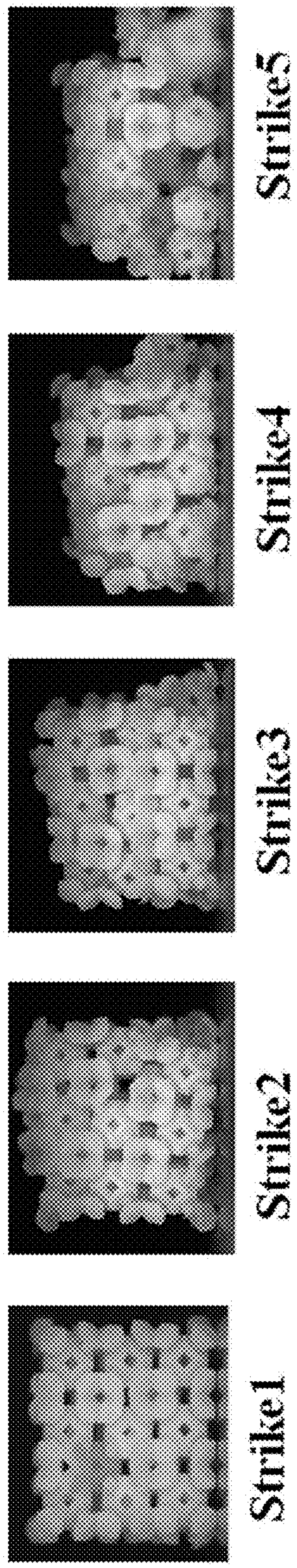
FIG. 16C is a diagram including various views of a 3D-printed AMM after multiple strikes, in accordance with the present disclosure.

An AMM sample, designed via Mechanism B in FIG. 2B, was printed via the multi-material 3D printer (as shown in FIGS. 16A-16C). For comparison, another sample with the exact same geometry was printed but with only hard phase material. Impact compression tests were performed using a drop tower. Under the dynamic load, the two-phase exhibited minimal damage and bounced back, whereas the single-material sample shattered in the first strike. The AMM sample withstood five strikes, indicating high toughness and high impact resistance.

The invention claimed is:

1. A mechanical metamaterial adaptive to an applied stress, comprising:

a plurality of meta-capsules arranged in a lattice structure, each meta-capsule comprising a plurality of rigid parts and a plurality of elastically deformable soft parts coupled to the plurality of rigid parts, such that at least a subset of the plurality of meta-capsules undergo a reconfiguration under the applied stress, the reconfiguration including:

a deformation of the soft parts of the subset of meta-capsules, and a reduction of a gap between adjacent rigid parts of the subset of meta-capsules, thereby increasing a stiffness of the mechanical metamaterial from a first stiffness to a second stiffness when the adjacent rigid parts come into contact.

2. The mechanical metamaterial of claim 1, the plurality of meta-capsules arranged in the lattice structure, such that at least two rigid parts of each meta-capsule are coupled to at least two rigid parts of an adjacent meta-capsule.

3. The mechanical metamaterial of claim 1, the lattice structure comprising a 2D square lattice.

4. The mechanical metamaterial of claim 1, the lattice structure comprising a 2D triangular square lattice.

5. The mechanical metamaterial of claim 1, the lattice structure comprising a Bravais lattice.

6. The mechanical metamaterial of claim 1, the Bravais lattice comprising a cubic lattice or a body-centered lattice.

7. The mechanical metamaterial of claim 1, each of the plurality of soft parts comprising an annular structure.

8. The mechanical metamaterial of claim 1, the applied stress comprising one of a tensile stress, a compressive stress, and a shear stress.

9. The mechanical metamaterial of claim 8, under an applied tensile stress, the adjacent rigid parts come into contact over a first contact surface area, and under an applied compressive stress, the adjacent rigid parts come into contact over a second contact surface area, the first contact surface area different from the second contact surface area.

10. The mechanical metamaterial of claim 9, the first contact surface area smaller than the second contact surface area.

11. The mechanical metamaterial of claim 1, the plurality of rigid parts of each meta-capsule formed of a rigid photosensitive polymer.

12. The mechanical metamaterial of claim 1, the plurality of soft parts of each meta-capsule formed of a flexible photosensitive polymer.

13. The mechanical metamaterial of claim 1, the plurality of rigid parts comprising a first rigid part formed by a pair of coplanar members intersecting at a point, the pair of coplanar members having four ends, with each end positioned within one of four second rigid parts, each second rigid part having an opening leading to an interior cavity.

14. The mechanical metamaterial of claim 13, the plurality of soft parts comprising four soft parts.

15. The mechanical metamaterial of claim 14, each of the soft parts coupled to the first rigid part and two second rigid parts.

16. The mechanical metamaterial of claim 13, the second rigid part comprising a cylindrical structure.

17. The mechanical metamaterial of claim 13, the first rigid part further comprising a member intersecting at the point, the member perpendicular to the pair of coplanar members and having two ends, with each end of the member positioned within one of two second rigid parts.

18. The mechanical metamaterial of claim 17, the plurality of soft parts comprising eight soft parts.

19. The mechanical metamaterial of claim 17, each of the soft parts coupled to the first rigid part and two second rigid parts.

20. The mechanical metamaterial of claim 1, upon removal of the applied stress, the reconfiguration of the subset of meta-capsules is reversed, thereby decreasing the stiffness from the second stiffness to the first stiffness.

* * * * *